(12) United States Patent
Wenren et al.

(10) Patent No.: US 12,078,784 B2
(45) Date of Patent: Sep. 3, 2024

(54) OPTICAL IMAGING LENS ASSEMBLY

(71) Applicant: Zhejiang Sunny Optics Co., Ltd, Yuyao (CN)

(72) Inventors: Jianke Wenren, Yuyao (CN); Fenglong Lu, Yuyao (CN); Fujian Dai, Yuyao (CN); Liefeng Zhao, Yuyao (CN)

(73) Assignee: Zhejiang Sunny Optics Co., Ltd (CN)

( * ) Notice: Subject to any disclaimer, the term of this patent is extended or adjusted under 35 U.S.C. 154(b) by 630 days.

(21) Appl. No.: 17/307,510

(22) Filed: May 4, 2021

(65) Prior Publication Data

US 2021/0263287 A1 Aug. 26, 2021

Related U.S. Application Data

(63) Continuation of application No. PCT/CN2019/113232, filed on Oct. 25, 2019.

(30) Foreign Application Priority Data

Mar. 21, 2019 (CN) .......................... 201910217849.7

(51) Int. Cl.
*G02B 13/18* (2006.01)
*G02B 9/60* (2006.01)
(Continued)

(52) U.S. Cl.
CPC ........... *G02B 13/0045* (2013.01); *G02B 9/60* (2013.01); *G02B 27/0025* (2013.01)

(58) Field of Classification Search
CPC ... G02B 9/00; G02B 9/60; G02B 9/62; G02B 9/64; G02B 13/00; G02B 13/001;
(Continued)

(56) References Cited

U.S. PATENT DOCUMENTS 8,570,670 B2 * 10/2013 Kubota .................. G02B 13/04
359/753
9,696,519 B1 * 7/2017 Chen .................. G02B 13/0045
(Continued)

FOREIGN PATENT DOCUMENTS

CN 103576285 A 2/2014
CN 104407431 A 3/2015
(Continued)

OTHER PUBLICATIONS

India First Examination Report for Application No. 202117020897, dated Mar. 31, 2022, 7 pages.

*Primary Examiner* — Thong Q Nguyen

(74) *Attorney, Agent, or Firm* — Barnes & Thornburg LLP

(57) ABSTRACT

The present disclosure discloses an optical imaging lens assembly including, sequentially from an object side to an image side along an optical axis, a first lens having refractive power, a concave object-side surface and a concave image-side surface; a second lens having positive refractive power; a third lens having refractive power and a convex object-side surface; a fourth lens having positive refractive power; and a fifth lens having negative refractive power. An effective focal length f1 of the first lens and a radius of curvature R1 of the object-side surface of the first lens satisfy $0.7 \leq f1/R1 < 1.5$.

15 Claims, 12 Drawing Sheets

(51) Int. Cl.
*G02B 13/00* (2006.01)
*G02B 27/00* (2006.01)

(58) Field of Classification Search
CPC .............. G02B 13/0015; G02B 13/002; G02B 13/0045; G02B 13/008; G02B 13/14; G02B 13/18
USPC ........................................ 359/714, 763, 770
See application file for complete search history.

(56) References Cited

U.S. PATENT DOCUMENTS

| | | | |
|---|---|---|---|
| 11,467,380 B2* | 10/2022 | Li | G02B 13/18 |
| 2015/0130999 A1 | 5/2015 | Tsai et al. | |
| 2017/0168264 A1 | 6/2017 | Chen et al. | |
| 2017/0205604 A1* | 7/2017 | Hsu | G02B 7/021 |
| 2018/0335618 A1 | 11/2018 | Huang et al. | |
| 2020/0292790 A1* | 9/2020 | Jung | G02B 21/36 |

FOREIGN PATENT DOCUMENTS

| | | | |
|---|---|---|---|
| CN | 105676430 A | 6/2016 | |
| CN | 105700116 A | 6/2016 | |
| CN | 106483626 A | 3/2017 | |
| CN | 106886080 A | 6/2017 | |
| CN | 106886081 A | 6/2017 | |
| CN | 107783251 A | 3/2018 | |
| CN | 107957621 A | 4/2018 | |
| CN | 108663771 A | 10/2018 | |
| CN | 109782418 A | 5/2019 | |
| CN | 110275276 A | 9/2019 | |
| CN | 209624889 U | 11/2019 | |

\* cited by examiner

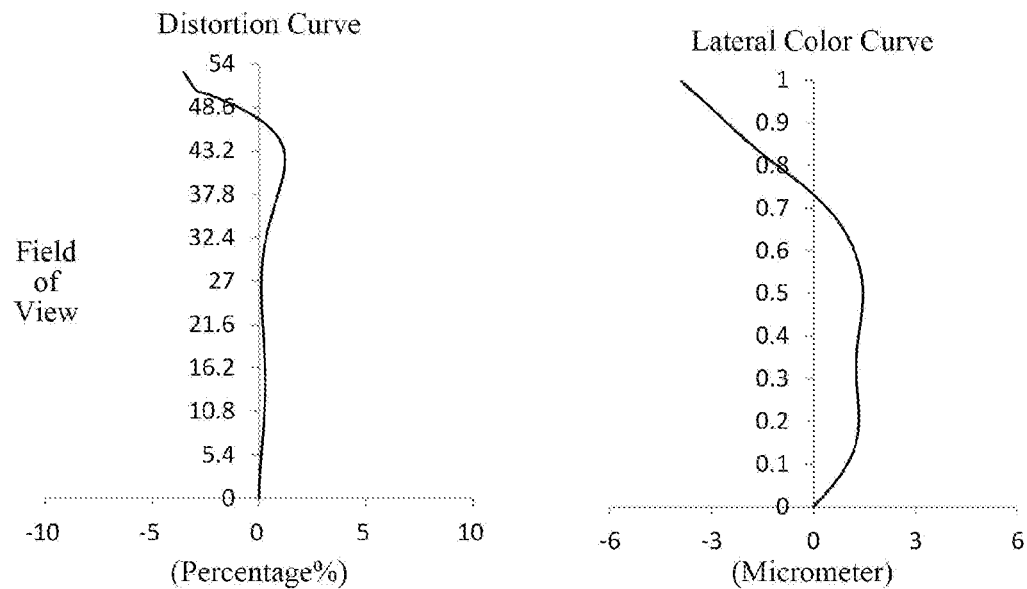
Fig. 2C
Fig. 2D
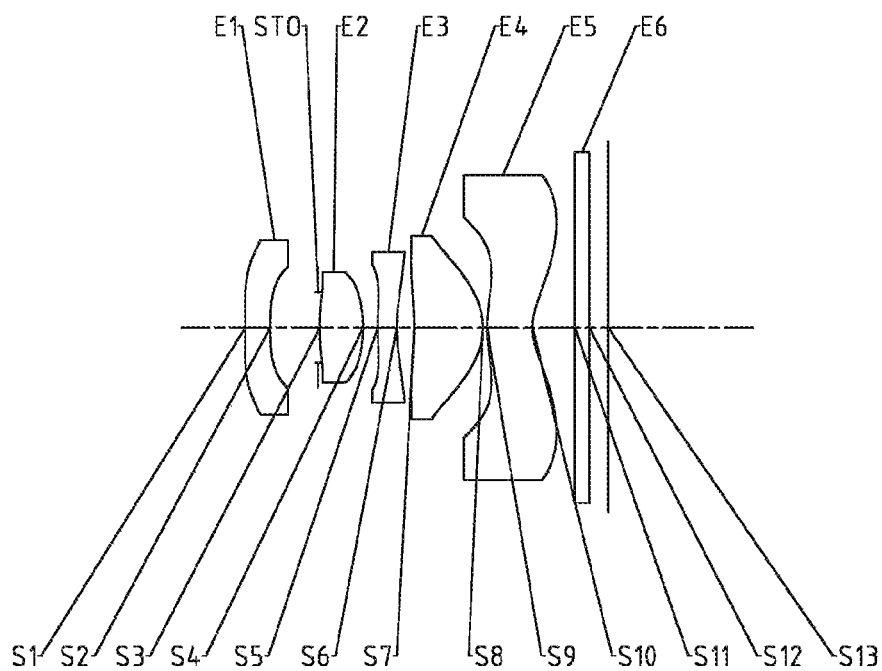
Fig. 3

OPTICAL IMAGING LENS ASSEMBLY

CROSS-REFERENCE TO RELATED APPLICATIONS

The present patent application is a continuation of International Application No. PCT/CN2019/113232, filed on Oct. 25, 2019, which claims priority to Chinese Patent Application No. 201910217849.7, filed before the China National Intellectual Property Administration (CNIPA) on Mar. 21, 2019. Both of the aforementioned patent applications are hereby incorporated by reference in their entireties.

TECHNICAL FIELD

The present disclosure relates to an optical imaging lens assembly, and more specifically, relates to an optical imaging lens assembly including five lenses.

BACKGROUND

In recent years, with the technological development of chips, such as CCD or CMOS, optical imaging lens assemblies have gradually developed in the field of miniaturization, light weight, and high pixels. More and more electronic products on the market have put forward higher and higher requirements on the field-of-view of the optical imaging lens assemblies. In order to meet these trends, optical imaging lens assemblies applied to various portable electronic products are required to be miniaturized, high image quality, and wide-angle.

Generally, the number of lenses is increased to meet the wide-angle requirements. However, the greater the number of lenses is, the less conducive to the miniaturization and weight reduction of the lens will be. Meanwhile, as the field-of-view of the lens assembly increases, the off-axis aberration of the lens assembly increases sharply, which is not conducive to improving the image quality. Although ensuring the incident height of light may be beneficial to correcting off-axis aberrations, a relative high incident height requires the lens to have a larger size, which is not conducive to the miniaturization of the lens assembly. Therefore, how to expand the angle of the field-of-view while achieving the miniaturization is one of the urgent problems to be solved in this field.

SUMMARY

The present disclosure provides an optical imaging lens assembly that is applicable to portable electronic products and at least solves or partially addresses at least one of the above disadvantages of the prior art.

The present disclosure provides an optical imaging lens assembly which may include, sequentially from an object side to an image side along an optical axis, a first lens having refractive power, a concave object-side surface and a concave image-side surface; a second lens having positive refractive power; a third lens having refractive power and a convex object-side surface; a fourth lens having positive refractive power; and a fifth lens having negative refractive power.

In one embodiment, the first lens may have negative refractive power; and an effective focal length f1 of the first lens and a radius of curvature R1 of the object-side surface of the first lens may satisfy $0.7 \leq f1/R1 < 1.5$.

In one embodiment, half of a diagonal length ImgH of an effective pixel area on an imaging plane of the optical imaging lens assembly and a total effective focal length f of the optical imaging lens assembly may satisfy $ImgH/f < 1.4$.

In one embodiment, an optical distortion ODT of the optical imaging lens assembly may satisfy $|ODT| < 5\%$.

In one embodiment, a maximum field-of-view FOV of the optical imaging lens assembly may satisfy $100° < FOV < 125°$.

In one embodiment, a total effective focal length f of the optical imaging lens assembly and an effective focal length f2 of the second lens may satisfy $0.5 < f/f2 < 1$.

In one embodiment, a total effective focal length f of the optical imaging lens assembly and an effective focal length f4 of the fourth lens may satisfy $0.6 < f4/f < 1.1$.

In one embodiment, an effective focal length f1 of the first lens and an effective focal length f5 of the fifth lens may satisfy $0 < f5/f1 < 0.5$.

In one embodiment, a total effective focal length f of the optical imaging lens assembly and a radius of curvature R2 of the image-side surface of the first lens may satisfy $0 < f/R2 < 0.5$.

In one embodiment, a radius of curvature R4 of an image-side surface of the second lens and a radius of curvature R8 of an image-side surface of the fourth lens may satisfy $0 < R8/R4 < 0.5$.

In one embodiment, a radius of curvature R10 of an image-side surface of the fifth lens and an effective focal length f5 of the fifth lens may satisfy $-0.7 < R10/f5 < -0.2$.

In one embodiment, a center thickness CT1 of the first lens along the optical axis and an air interval T12 between the first lens and the second lens along the optical axis may satisfy $0.1 < CT1/T12 < 0.6$.

In one embodiment, a center thickness CT2 of the second lens along the optical axis and a center thickness CT3 of the third lens along the optical axis may satisfy $0.2 < CT3/CT2 < 0.7$.

In one embodiment, a center thickness CT5 of the fifth lens along the optical axis and an edge thickness ET5 of the fifth lens may satisfy $0.2 < CT5/ET5 < 0.7$.

In one embodiment, an edge thickness ET1 of the first lens and an edge thickness ET2 of the second lens may satisfy $0.7 < ET2/ET1 < 1.2$.

In one embodiment, SAG22, being an on-axis distance from an intersection of an image-side surface of the second lens and the optical axis to a vertex of an effective radius of the image-side surface of the second lens, and SAG42, being an on-axis distance from an intersection of an image-side surface of the fourth lens and the optical axis to a vertex of an effective radius of the image-side surface of the fourth lens, may satisfy $0.1 < SAG22/SAG42 < 0.6$.

In one embodiment, a combined focal length f2345 of the second lens, the third lens, the fourth lens, and the fifth lens and an effective focal length f2 of the second lens may satisfy $0.5 < f2345/f2 < 1$.

In one embodiment, an air interval T23 between the second lens and the third lens along the optical axis, an air interval T34 between the third lens and the fourth lens along the optical axis, an air interval T45 between the fourth lens and the fifth lens along the optical axis and a center thickness CT4 of the fourth lens along the optical axis may satisfy $0.3 < (T23+T34+T45)/CT4 < 0.9$.

The present disclosure relates to a five-piece lens assembly, and the above optical imaging lens assembly has at least one beneficial effect, such as large field-of-view, small distortion, miniaturization, and high image quality and the like, by rationally configuring the refractive power, the surface shape, the center thickness of each lens, and the on-axis spaced interval between the lenses and the like.

BRIEF DESCRIPTION OF THE DRAWINGS

Other features, objects, and advantages of the present disclosure will become more apparent from the following detailed description of the non-limiting embodiments with reference to the accompanying drawings. In the drawings:

FIGS. 2A to 2D illustrate longitudinal aberration curves, astigmatic curves, a distortion curve, and a lateral color curve of the optical imaging lens assembly of the example 1, respectively;

FIG. 3 illustrates a schematic structural view of an optical imaging lens assembly according to example 2 of the present disclosure;

DETAILED DESCRIPTION OF EMBODIMENTS

Figure 1:
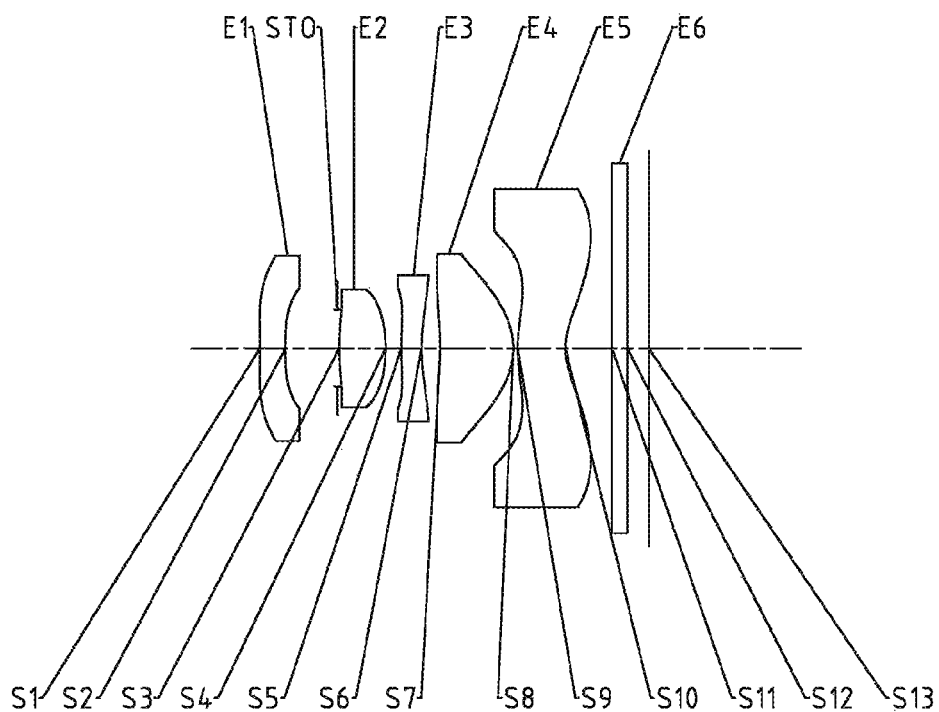
FIG. 1 illustrates a schematic structural view of an optical imaging lens assembly according to example 1 of the present disclosure.

For a better understanding of the present disclosure, various aspects of the present disclosure will be described in more detail with reference to the accompanying drawings. It should be understood that the detailed description is merely illustrative of the exemplary embodiments of the present disclosure and is not intended to limit the scope of the present disclosure in any way. Throughout the specification, the same reference numerals refer to the same elements. The expression "and/or" includes any and all combinations of one or more of the associated listed items.

It should be noted that in the present specification, the expressions such as first, second, third are used merely for distinguishing one feature from another, without indicating any limitation on the features. Thus, a first lens discussed below may also be referred to as a second lens or a third lens without departing from the teachings of the present disclosure.

In the accompanying drawings, the thickness, size and shape of the lens have been somewhat exaggerated for the convenience of explanation. In particular, shapes of spherical surfaces or aspheric surfaces shown in the accompanying drawings are shown by way of example. That is, shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

Herein, the paraxial area refers to an area near the optical axis. If a surface of a lens is convex and the position of the convex is not defined, it indicates that the surface of the lens is convex at least in the paraxial region; and if a surface of a lens is concave and the position of the concave is not defined, it indicates that the surface of the lens is concave at least in the paraxial region. In each lens, the surface closest to the object is referred to as an object-side surface of the lens, and the surface closest to the imaging plane is referred to as an image-side surface of the lens.

It should be further understood that the terms "comprising," "including," "having," "containing" and/or "contain," when used in the specification, specify the presence of stated features, elements and/or components, but do not exclude the presence or addition of one or more other features, elements, components and/or combinations thereof. In addition, expressions, such as "at least one of," when preceding a list of features, modify the entire list of features rather than an individual element in the list. Further, the use of "may," when describing embodiments of the present disclosure, refers to "one or more embodiments of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It will be further understood that terms, such as those defined in commonly used dictionaries, should be interpreted as having a meaning that is consistent with the meaning in the context of the relevant art and will not be interpreted in an idealized or overly formal sense, unless expressly so defined herein.

It should also be noted that, the examples in the present disclosure and the features in the examples may be combined with each other on a non-conflict basis. The present disclosure will be described in detail below with reference to the accompanying drawings and in combination with the examples.

The features, principles, and other aspects of the present disclosure are described in detail below.

An optical imaging lens assembly according to an exemplary embodiment of the present disclosure may include, for example, five lenses having refractive power. The five lenses are a first lens, a second lens, a third lens, a fourth lens and a fifth lens. The five lenses are arranged sequentially from an object side to an image side along an optical axis. Among the first lens to the fifth lens, there may be an air interval between each two adjacent lenses.

In an exemplary embodiment, the first lens has positive or negative refractive power, an object-side surface thereof may be concave, and an image-side surface thereof may be concave. The second lens may have positive refractive power. The third lens has positive or negative refractive power, and an object-side surface thereof may be convex. The fourth lens may have positive refractive power. The fifth lens may have negative refractive power. Reasonably configuration of the refractive power and surface shape of the first lens may ensure that the first lens has good workability and make the optical imaging lens assembly has the advantage of a large field-of-view. At the same time, it is also beneficial to reduce the incident angle of the principal ray of the optical imaging lens assembly onto the imaging plane, thereby increasing the relative illuminance of the imaging plane. By reasonably configuring the refractive power of the second lens, the fourth lens and the fifth lens, the off-axis aberration of the optical imaging lens assembly is advantageously corrected to improve the image quality. Setting the object-side surface of the third lens as a convex surface is beneficial to ensure that the optical imaging lens assembly has a small optical distortion.

In an exemplary embodiment, the optical imaging lens assembly according to the present disclosure may satisfy: $0.7 \leq f1/R1 < 1.5$, where f1 is an effective focal length of the first lens, and R1 is a radius of curvature of the object-side surface of the first lens. More specifically, f1 and R1 may further satisfy: $0.7 \leq f1/R1 < 1.2$, for example, $0.70 \leq f1/R1 \leq 1.03$. By reasonably controlling the ratio of the effective focal length of the first lens to the radius of curvature of the object-side surface of the first lens, the field-of-view of the lens assembly is advantageously increased to ensure the wide-angle characteristics of the optical imaging lens assembly. Optionally, the first lens may have positive refractive power.

In an exemplary embodiment, the optical imaging lens assembly according to the present disclosure may satisfy: ImgH/f<1.4, where ImgH is half of a diagonal length of an effective pixel area on an imaging plane of the optical imaging lens assembly, and f is a total effective focal length of the optical imaging lens assembly. More specifically, ImgH and f may further satisfy: $1.0 < \text{ImgH}/f < 1.4$, for example, $1.22 \leq \text{ImgH}/f \leq 1.28$. Reasonable control of the ratio of ImgH to f is beneficial to achieving a larger imaging height while achieving a relatively large total effective focal length. Also, it is also beneficial to achieve the miniaturization of the lens assembly, and improve the image quality effectively.

In an exemplary embodiment, the optical imaging lens assembly according to the present disclosure may satisfy: |ODT|<5%, where ODT is an optical distortion of the optical imaging lens assembly. In other words, the maximum distortion of the optical imaging lens assembly does not exceed 5%. More specifically, ODT may further satisfy: 2%<|ODT|<5%, for example, 2.92%≤|ODT|≤4.99%. By reasonably controlling the size of the optical distortion of the optical imaging lens assembly, it is beneficial to achieve a larger field-of-view while obtaining better image quality.

In an exemplary embodiment, the optical imaging lens assembly according to the present disclosure may satisfy: 100°<FOV<125°, where FOV is a maximum field-of-view of the optical imaging lens assembly. More specifically, FOV may further satisfy: 104.0°≤FOV≤107.1°. Controlling the field-of-view of the optical imaging lens assembly within the range of 100° to 125° is beneficial to expanding the range in which object information can be obtained.

In an exemplary embodiment, the optical imaging lens assembly according to the present disclosure may satisfy: $0.5 < f/f2 < 1$, where f is a total effective focal length of the optical imaging lens assembly, and f2 is an effective focal length of the second lens. More specifically, f and f2 may further satisfy: $0.60 \leq f/f2 \leq 0.89$. Reasonably controlling the ratio range of f and f2 is beneficial to increasing the field-of-view of the lens assembly.

In an exemplary embodiment, the optical imaging lens assembly according to the present disclosure may satisfy: $0.6 < f4/f < 1.1$, where f is a total effective focal length of the optical imaging lens assembly, and f4 is an effective focal length of the fourth lens. More specifically, f4 and f may further satisfy: $0.68 \leq f4/f \leq 1.02$. By reasonably controlling the ratio of the effective focal length of the fourth lens to the total effective focal length of the optical imaging lens assembly, it is beneficial to reduce the influence of distortion on the imaging of the lens assembly, so as to obtain better image quality.

In an exemplary embodiment, the optical imaging lens assembly according to the present disclosure may satisfy: $0 < f5/f1 < 0.5$, where f1 is an effective focal length of the first lens, and f5 is an effective focal length of the fifth lens. More specifically, f5 and f1 may further satisfy: $0.15 \leq f5/f1 \leq 0.41$. Reasonably controlling the refractive power of the fifth lens and the first lens may effectively reduce the optical sensitivity of the first lens and the fifth lens, which is conducive to mass production.

In an exemplary embodiment, the optical imaging lens assembly according to the present disclosure may satisfy: $0.5 < f2345/f2 < 1$, where f2345 is a combined focal length of the second lens, the third lens, the fourth lens, and the fifth lens, and f2 is an effective focal length of the second lens. More specifically, f2345 and f2 may further satisfy: $0.58 \leq f2345/f2 \leq 0.78$. By reasonably controlling the ratio of the combined focal length of the second lens, the third lens, the fourth lens and the fifth lens to the effective focal length of the second lens, it is beneficial to control the aberration of the lens assembly, especially to control the astigmatic when the field-of-view is increased.

In an exemplary embodiment, the optical imaging lens assembly according to the present disclosure may satisfy: $0 < f/R2 < 0.5$, where f is a total effective focal length of the optical imaging lens assembly, and R2 is a radius of curvature of the image-side surface of the first lens. More specifically, f and R2 may further satisfy: $0.20 \leq f/R2 \leq 0.39$. When the conditional expression $0 < f/R2 < 0.5$ is satisfied, the curvature of the image-side surface of the first lens may be effectively controlled, so that the field curvature contributed by the image-side surface of the first lens is within a reasonable range, and the optical sensitivity of the object-ide surface of the first lens may be reduced.

In an exemplary embodiment, the optical imaging lens assembly according to the present disclosure may satisfy: $0 < R8/R4 < 0.5$, where R4 is a radius of curvature of an image-side surface of the second lens, and R8 is a radius of curvature of an image-side surface of the fourth lens. More specifically, R8 and R4 may further satisfy: $0.24 \leq R8/R4 \leq 0.45$. By reasonably controlling the ratio of the radius of curvature of the image-side surface of the fourth lens to the radius of curvature of the image-side surface of the second lens, the sensitivity of the system may be effectively reduced, which is beneficial for the optical imaging lens assembly to achieve the characteristics of large field-of-view and small distortion. Optionally, the image-side surface of the second lens may be convex, and the image-side surface of the fourth lens may be convex.

In an exemplary embodiment, the optical imaging lens assembly according to the present disclosure may satisfy: −0.7<R10/f5<−0.2, where R10 is a radius of curvature of an image-side surface of the fifth lens, and f5 is an effective focal length of the fifth lens. More specifically, R10 and f5 may further satisfy: −0.68≤R10/f5≤−0.27. By reasonably controlling the ratio of the radius of curvature of the image-side surface of the fifth lens to the effective focal length of the fifth lens, the optical sensitivity of the fifth lens may be effectively reduced, which is conducive to mass production. Optionally, the image-side surface of the fifth lens may be concave.

In an exemplary embodiment, the optical imaging lens assembly according to the present disclosure may satisfy: 0.1<CT1/T12<0.6, where CT1 is a center thickness of the first lens along the optical axis, and T12 is an air interval between the first lens and the second lens along the optical axis. More specifically, CT1 and T12 may further satisfy: 0.21≤CT1/T12≤0.50. By reasonably controlling the ratio of the center thickness of the first lens along the optical axis and the air interval between the first lens and the second lens along the optical axis, the optical sensitivity of the first lens may be effectively reduced to ensure better image quality, and mass production is advantageously achieved.

In an exemplary embodiment, the optical imaging lens assembly according to the present disclosure may satisfy: 0.2<CT3/CT2<0.7, where CT2 is a center thickness of the second lens along the optical axis, and CT3 is a center thickness of the third lens along the optical axis. More specifically, CT3 and CT2 may further satisfy: 0.32≤CT3/CT2≤0.61. By reasonably configuring the center thicknesses of the third lens and the second lens along the optical axis, the thickness sensitivity of the optical imaging lens assembly may be effectively reduced, and the distortion may be reduced.

In an exemplary embodiment, the optical imaging lens assembly according to the present disclosure may satisfy: 0.3<(T23+T34+T45)/CT4<0.9, where T23 is an air interval between the second lens and the third lens along the optical axis, T34 is an air interval between the third lens and the fourth lens along the optical axis, T45 is an air interval between the fourth lens and the fifth lens along the optical axis, and CT4 is a center thickness of the fourth lens along the optical axis. More specifically, T23, T34, T45 and CT4 may further satisfy: 0.34≤(T23+T34+T45)/CT4≤0.80. Satisfying the conditional expression 0.3<(T23+T34+T45)/CT4<0.9 is beneficial to ensuring the assembly process of the lens, and may achieve the miniaturization of the lens assembly to make the lens assembly better meet the needs of overall assembly.

In an exemplary embodiment, the optical imaging lens assembly according to the present disclosure may satisfy: 0.2<CT5/ET5<0.7, where CT5 is a center thickness of the fifth lens along the optical axis, and ET5 is an edge thickness of the fifth lens in a direction parallel to the optical axis. More specifically, CT5 and ET5 may further satisfy: 0.33≤CT5/ET5≤0.61. By reasonably controlling the ratio of CT5 to ET5, the processing difficulty of the lens may be reduced, and the angle between the chief ray and the optical axis when the chief ray is incident on the imaging plane may be reduced, thereby improving the relative illuminance on the imaging plane.

In an exemplary embodiment, the optical imaging lens assembly according to the present disclosure may satisfy: 0.7<ET2/ET1<1.2, where ET1 is an edge thickness of the first lens in a direction parallel to the optical axis, and ET2 is an edge thickness of the second lens in the direction parallel to the optical axis. More specifically, ET2 and ET1 may further satisfy: 0.75<ET2/ET1<1.06. By reasonably controlling the ratio of the edge thickness of the second lens to the edge thickness of the first lens, it is beneficial to ensure the molding processability and assembly stability of the lens, thereby ensuring better productivity.

In an exemplary embodiment, the optical imaging lens assembly according to the present disclosure may satisfy: 0.1<SAG22/SAG42<0.6, where SAG22 is an on-axis distance from an intersection of an image-side surface of the second lens and the optical axis to a vertex of an effective radius of the image-side surface of the second lens, and SAG42 is an on-axis distance from an intersection of an image-side surface of the fourth lens and the optical axis to a vertex of an effective radius of the image-side surface of the fourth lens. More specifically, SAG22 and SAG42 may further satisfy: 0.32≤SAG22/SAG42≤0.44. By reasonably controlling the ratio of SAG22 to SAG42, it is beneficial for the chief ray to have a smaller incident angle and higher relative illuminance when it is incident on the imaging plane. Also, it is beneficial to make the fourth lens have better processability.

In an exemplary embodiment, the above optical imaging lens assembly may further include at least one stop. The stop may be disposed at an appropriate position as required, for example, between the first lens and the second lens. Optionally, the above optical imaging lens assembly may further include an optical filter for correcting the color deviation and/or a protective glass for protecting the photosensitive element located on an imaging plane.

The optical imaging lens assembly according to the above embodiments of the present disclosure may employ a plurality of lenses, such as five lenses as described above. By properly configuring the refractive power of each lens, the surface shape, the center thickness of each lens, and spaced intervals along the optical axis between the lenses, the size and the sensitivity of the imaging lens assembly may be effectively reduced, and the workability of the imaging lens assembly may be improved, such that the optical imaging lens assembly is more advantageous for production processing and may be applied to portable electronic products. The present disclosure proposes a solution for a five-piece lens assembly, which has a relatively large field-of-view, small distortion, and high image quality, and may be applied to higher-pixel sensors and stronger image processing technology.

In the embodiments of the present disclosure, at least one of the surfaces of the lenses is aspheric, that is, at least one of the object-side surface and the image-side surface of each of the first lens, the second lens, the third lens, the fourth lens, and the fifth lens is aspheric. The aspheric lens is characterized by a continuous change in curvature from the center of the lens to the periphery of the lens. Unlike a spherical lens having a constant curvature from the center of the lens to the periphery of the lens, the aspheric lens has a better curvature radius characteristic, and has the advantages of improving distortion aberration and improving astigmatic aberration. With aspheric lens, the aberrations that occur during imaging may be eliminated as much as possible, and thus improving the image quality. Optionally, the object-side surface and the image-side surface of each of the first lens, the second lens, the third lens, the fourth lens and the fifth lens are aspheric.

However, it will be understood by those skilled in the art that the number of lenses constituting the optical imaging lens assembly may be varied to achieve the various results and advantages described in this specification without departing from the technical solution claimed by the present disclosure. For example, although the embodiment is described by taking five lenses as an example, the optical imaging lens assembly is not limited to include five lenses. The optical imaging lens assembly may also include other numbers of lenses if desired.

Some specific examples of an optical imaging lens assembly applicable to the above embodiment will be further described below with reference to the accompanying drawings.

Example 1

An optical imaging lens assembly according to example 1 of the present disclosure is described below with reference to FIG. 1 to FIG. 2D. FIG. 1 shows a schematic structural view of the optical imaging lens assembly according to example 1 of the present disclosure.

As shown in FIG. 1, the optical imaging lens assembly includes a first lens E1, a stop STO, a second lens E2, a third lens E3, a fourth lens E4, a fifth lens E5, an optical filter E6 and an imaging plane 513, which are sequentially arranged from an object side to an image side along an optical axis.

The first lens E1 has negative refractive power, an object-side surface S1 thereof is concave, and an image-side surface S2 thereof is concave. The second lens E2 has positive refractive power, an object-side surface S3 thereof is convex, and an image-side surface S4 thereof is convex. The third lens E3 has negative refractive power, an object-side surface S5 thereof is convex, and an image-side surface S6 thereof is concave. The fourth lens E4 has positive refractive power, an object-side surface S7 thereof is concave, and an image-side surface S8 thereof is convex. The fifth lens E5 has negative refractive power, an object-side surface S9 thereof is convex, and an image-side surface S10 thereof is concave. The optical filter E6 has an object-side surface S11 and an image-side surface S12. Light from an object sequentially passes through the respective surfaces S1 to S12 and is finally imaged on the imaging plane S13.

Table 1 is a table illustrating basic parameters of the optical imaging lens assembly of example 1, wherein the units for the radius of curvature, the thickness and the focal length are millimeter (mm).

TABLE 1

Example 1: f = 2.12 mm, TTL = 5.31 mm, ImgH = 2.70 mm, f/EPD = 2.29

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| S1 | Aspheric | −7.391 | 0.3491 | 1.55 | 56.1 | −6.73 | −30.1045 |
| S2 | Aspheric | 7.4380 | 0.7093 | | | | 0.0000 |
| STO | Spherical | Infinite | 0.0250 | | | | |
| S3 | Aspheric | 3.6819 | 0.6332 | 1.55 | 56.1 | 2.51 | −26.6546 |
| S4 | Aspheric | −2.0458 | 0.2158 | | | | −0.1435 |
| S5 | Aspheric | 4.5263 | 0.2754 | 1.67 | 20.3 | −9.16 | 0.0000 |
| S6 | Aspheric | 2.5351 | 0.2552 | | | | 0.0000 |
| S7 | Aspheric | −3.9122 | 1.0000 | 1.55 | 56.1 | 1.99 | −35.4570 |
| S8 | Aspheric | −0.9286 | 0.0599 | | | | −0.8913 |
| S9 | Aspheric | 2.1424 | 0.6508 | 1.67 | 20.3 | −2.75 | −1.3659 |
| S10 | Aspheric | 0.8678 | 0.6362 | | | | −3.9053 |
| S11 | Spherical | Infinite | 0.2100 | 1.52 | 64.2 | | |
| S12 | Spherical | Infinite | 0.2844 | | | | |
| S13 | Spherical | Infinite | | | | | |

Where, f is a total effective focal length of the optical imaging lens assembly, TTL is a distance along the optical axis from the object-side surface S1 of the first lens E1 to the imaging plane S13 of the optical imaging lens assembly, ImgH is half of a diagonal length of an effective pixel area on the imaging plane S13 of the optical imaging lens assembly, and EPD is an entrance pupil diameter of the optical imaging lens assembly.

In example 1, the object-side surface and the image-side surface of any one of the first lens E1 to the fifth lens E5 are aspheric. The surface shape x of each aspheric lens may be defined by using, but not limited to, the following aspheric formula:

$$x = \frac{ch^2}{1 + \sqrt{1 - (k+1)c^2 h^2}} + \sum A_i h^i \quad (1)$$

Where, x is the sag—the axis-component of the displacement of the surface from the aspheric vertex, when the surface is at height h from the optical axis; c is a paraxial curvature of the aspheric surface, c=1/R (that is, the paraxial curvature c is reciprocal of the radius of curvature R in the above Table 1); k is a conic coefficient; Ai is a correction coefficient for the i-th order of the aspheric surface. Table 2 below shows high-order coefficients A4, A6, A8, A10, A12, A14, A16, A18 and A20 applicable to each aspheric surface S1 to S10 in example 1.

TABLE 2

| Surface number | A4 | A6 | A8 | A10 | A12 | A14 | A16 | A18 | A20 |
|---|---|---|---|---|---|---|---|---|---|
| S1 | 2.6332E−01 | −2.6795E−01 | 3.9719E−01 | −5.7577E−01 | 6.3659E−01 | −4.7546E−01 | 2.2232E−01 | −5.8837E−02 | 6.7130E−03 |
| S2 | 3.7093E−01 | −1.6868E−01 | 3.5641E−01 | −2.4354E+00 | 1.0586E+01 | −2.4234E+01 | 3.1021E+01 | −2.0998E+01 | 5.8103E+00 |
| S3 | −1.1170E−01 | 4.8345E+00 | −8.5455E+01 | 8.5181E+02 | −5.2192E+03 | 1.9873E+04 | −4.5760E+04 | 5.8216E+04 | −3.1361E+04 |
| S4 | −1.5963E−01 | −3.0992E−01 | 3.6478E+00 | −1.8569E+01 | 5.1795E+01 | −9.1100E+01 | 1.0543E+02 | −7.9497E+01 | 2.9693E+01 |
| S5 | −2.9829E−01 | 1.4874E−02 | −1.0732E+00 | 1.1754E+01 | −4.6805E+01 | 9.6417E+01 | −1.0972E+02 | 6.5270E+01 | −1.5801E+01 |
| S6 | −3.9969E−02 | −9.1922E−01 | 3.6744E+00 | −7.8313E+00 | 1.0135E+01 | −8.1052E+00 | 3.8812E+00 | −1.0095E+00 | 1.0817E−01 |
| S7 | 1.9632E−01 | −6.4157E−01 | 1.2179E+00 | −1.1292E+00 | 2.8254E−01 | 3.8576E−01 | −3.8768E−01 | 1.4185E−01 | −1.9268E−02 |
| S8 | 1.7569E−01 | −2.6869E−01 | 4.2079E−01 | −5.1262E−01 | 4.5031E−01 | −2.5358E−01 | 8.6372E−02 | −1.6188E−02 | 1.2765E−03 |
| S9 | −2.3796E−01 | 1.4711E−02 | 1.6496E−01 | −2.4386E−01 | 1.9060E−01 | −9.2681E−02 | 2.7598E−02 | −4.5204E−03 | 3.0855E−04 |
| S10 | −1.6634E−01 | 1.3165E−01 | −7.9527E−02 | 3.3684E−02 | −9.7984E−03 | 1.8933E−03 | −2.3094E−04 | 1.6035E−05 | −4.8126E−07 |

Figures 2A, 2B:
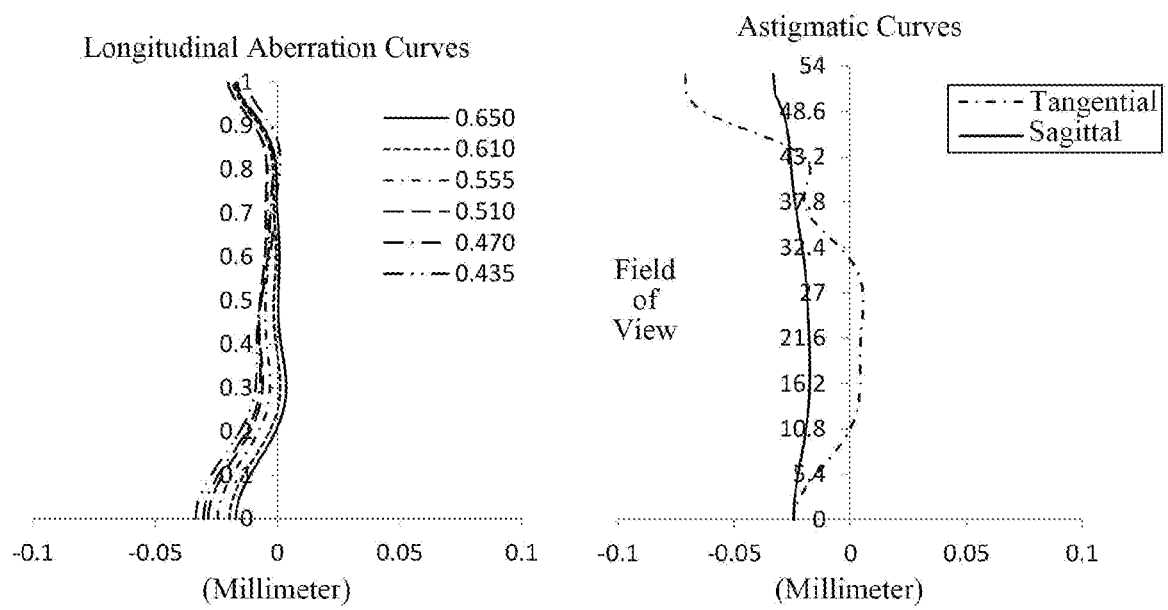

FIG. 2A illustrates longitudinal aberration curves of the optical imaging lens assembly according to example 1, representing the deviations of focal points converged by light of different wavelengths after passing through the lens assembly. FIG. 2B illustrates astigmatic curves of the optical imaging lens assembly according to example 1, representing the curvatures of a tangential plane and the curvatures of a sagittal plane. FIG. 2C illustrates a distortion curve of the optical imaging lens assembly according to example 1, representing the amounts of distortion corresponding to different field-of-views. FIG. 2D illustrates a lateral color curve of the optical imaging lens assembly according to example 1, representing the deviations of different image heights on an imaging plane after light passes through the lens assembly. It can be seen from FIG. 2A to FIG. 2D that the optical imaging lens assembly provided in example 1 may achieve good image quality.

Example 2

An optical imaging lens assembly according to example 2 of the present disclosure is described below with reference to FIG. 3 to FIG. 4D. In this example and the following examples, for the purpose of brevity, the description of parts similar to those in example 1 will be omitted. FIG. 3 shows a schematic structural view of the optical imaging lens assembly according to example 2 of the present disclosure.

As shown in FIG. 3, the optical imaging lens assembly includes a first lens E1, a stop STO, a second lens E2, a third lens E3, a fourth lens E4, a fifth lens E5, an optical filter E6 and an imaging plane S13, which are sequentially arranged from an object side to an image side along an optical axis.

The first lens E1 has negative refractive power, an object-side surface S1 thereof is concave, and an image-side surface S2 thereof is concave. The second lens E2 has positive refractive power, an object-side surface S3 thereof is convex, and an image-side surface S4 thereof is convex. The third lens E3 has negative refractive power, an object-side surface S5 thereof is convex, and an image-side surface S6 thereof is concave. The fourth lens E4 has positive refractive power, an object-side surface S7 thereof is concave, and an image-side surface S8 thereof is convex. The fifth lens E5 has negative refractive power, an object-side surface S9 thereof is convex, and an image-side surface S10 thereof is concave. The optical filter E6 has an object-side surface Con and an image-side surface S12. Light from an object sequentially passes through the respective surfaces S1 to S12 and is finally imaged on the imaging plane S13.

Table 3 is a table illustrating basic parameters of the optical imaging lens assembly of example 2, wherein the units for the radius of curvature, the thickness and the focal length are millimeter (mm). Table 4 shows high-order coefficients applicable to each aspheric surface in example 2, wherein the surface shape of each aspheric surface may be defined by the formula (1) given in the above example 1.

TABLE 3

Example 2: f = 2.11 mm, TTL = 5.28 mm, ImgH = 2.70 mm, f/EPD = 2.29

| Surface number | Surface type | Radius of curvature | Thickness/ Distance | Refractive index | Abbe number | Focal length | Conic coefficient |
|---|---|---|---|---|---|---|---|
| OBJ | Spherical | Infinite | Infinite | | | | |
| S1 | Aspheric | −8.502 | 0.3608 | 1.55 | 56.1 | −6.71 | −28.9069 |
| S2 | Aspheric | 6.5359 | 0.6976 | | | | 0.0000 |
| STO | Spherical | Infinite | 0.0250 | | | | |
| S3 | Aspheric | 3.5526 | 0.6295 | 1.55 | 56.1 | 2.51 | −23.2798 |
| S4 | Aspheric | −2.0855 | 0.2135 | | | | −0.0466 |
| S5 | Aspheric | 4.2500 | 0.2765 | 1.67 | 20.3 | −9.45 | 0.0000 |
| S6 | Aspheric | 2.4709 | 0.2556 | | | | 0.0000 |
| S7 | Aspheric | −3.8513 | 1.0000 | 1.55 | 56.1 | 1.97 | −37.1660 |
| S8 | Aspheric | −0.9168 | 0.0599 | | | | −0.9119 |
| S9 | Aspheric | 2.1362 | 0.6624 | 1.67 | 20.3 | −2.64 | −1.6258 |
| S10 | Aspheric | 0.8442 | 0.6161 | | | | −3.9219 |
| S11 | Spherical | Infinite | 0.2100 | 1.52 | 64.2 | | |
| S12 | Spherical | Infinite | 0.2643 | | | | |
| S13 | Spherical | Infinite | | | | | |

TABLE 4

| Surface number | A4 | A6 | A8 | A10 | A12 | A14 | A16 | A18 | A20 |
|---|---|---|---|---|---|---|---|---|---|
| S1 | 2.6332E−01 | −2.6795E−01 | 3.9719E−01 | −5.7577E−01 | 6.3659E−01 | −4.7546E−01 | 2.2232E−01 | −5.8837E−02 | 6.7130E−03 |
| S2 | 3.7093E−01 | −1.6868E−01 | 3.5641E−01 | −2.4354E+00 | 1.0586E+01 | −2.4234E+01 | 3.1021E+01 | −2.0998E+01 | 5.8103E+00 |
| S3 | −1.1170E−01 | 4.8345E+00 | −8.5455E+01 | 8.5181E+02 | −5.2192E+03 | 1.9873E+04 | −4.5760E+04 | 5.8216E+04 | −3.1361E+04 |
| S4 | −1.5963E−01 | −3.0992E−01 | 3.6478E+00 | −1.8569E+01 | 5.1795E+01 | −9.1100E+01 | 1.0543E+02 | −7.9497E+01 | 2.9693E+01 |
| S5 | −2.9829E−01 | 1.4874E−02 | −1.0732E+00 | 1.1754E+01 | −4.6805E+01 | 9.6417E+01 | −1.0972E+02 | 6.5270E+01 | −1.5801E+01 |
| S6 | −3.9969E−02 | −9.1922E−01 | 3.6744E+00 | −7.8313E+00 | 1.0135E+01 | −8.1052E+00 | 3.8812E+00 | −1.0095E+00 | 1.0817E−01 |
| S7 | 1.9632E−01 | −6.4157E−01 | 1.2179E+00 | −1.1292E+00 | 2.8254E−01 | 3.8576E−01 | −3.8768E−01 | 1.4185E−01 | −1.9268E−02 |
| S8 | 1.7569E−01 | −2.6869E−01 | 4.2079E−01 | −5.1262E−01 | 4.5031E−01 | −2.5358E−01 | 8.6372E−02 | −1.6188E−02 | 1.2765E−03 |
| S9 | −2.3796E−01 | 1.4711E−02 | 1.6496E−01 | −2.4386E−01 | 1.9060E−01 | −9.2681E−02 | 2.7598E−02 | −4.5204E−03 | 3.0855E−04 |
| S10 | −1.6634E−01 | 1.3165E−01 | −7.9527E−02 | 3.3684E−02 | −9.7984E−03 | 1.8933E−03 | −2.3094E−04 | 1.6035E−05 | −4.8126E−07 |

Figure 4A:
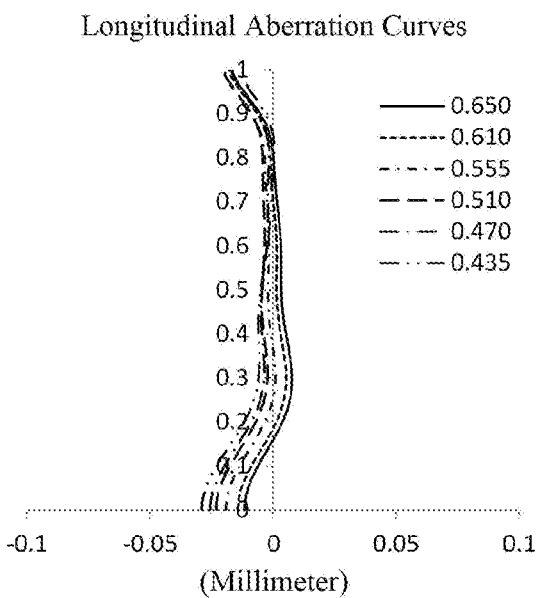
FIGS. 4A to 4D illustrate longitudinal aberration curves, astigmatic curves, a distortion curve, and a lateral color curve of the optical imaging lens assembly of the example 2, respectively.
Figure 4B:
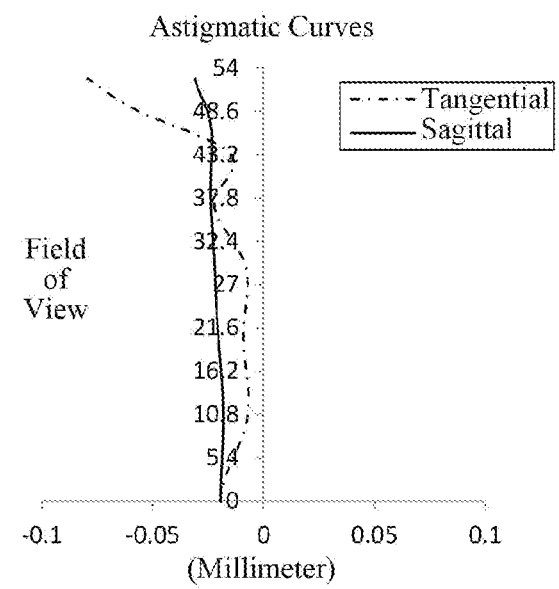
Figure 4C:
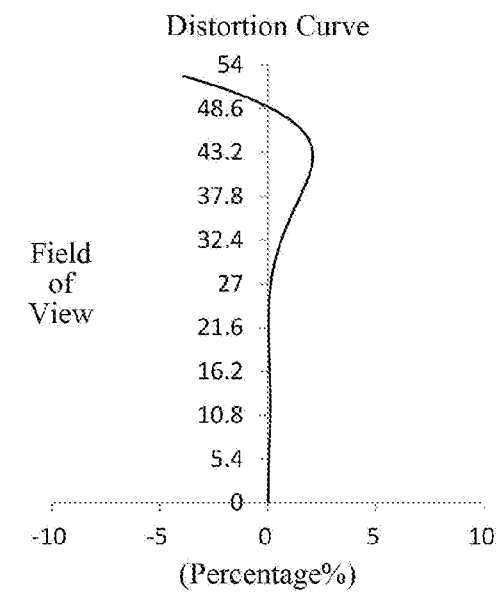
Figure 4D:
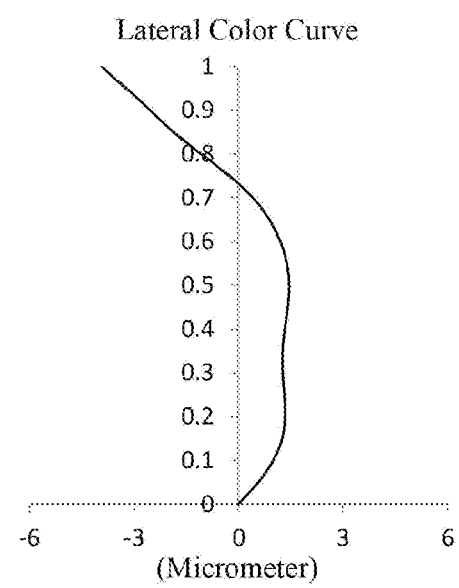

FIG. 4A illustrates longitudinal aberration curves of the optical imaging lens assembly according to example 2, representing the deviations of focal points converged by light of different wavelengths after passing through the lens assembly. FIG. 4B illustrates astigmatic curves of the optical imaging lens assembly according to example 2, representing the curvatures of a tangential plane and the curvatures of a sagittal plane. FIG. 4C illustrates a distortion curve of the optical imaging lens assembly according to example 2, representing the amounts of distortion corresponding to different field-of-views. FIG. 4D illustrates a lateral color curve of the optical imaging lens assembly according to example 2, representing the deviations of different image heights on an imaging plane after light passes through the lens assembly. It can be seen from FIG. 4A to FIG. 4D that the optical imaging lens assembly provided in example 2 may achieve good image quality.

Example 3

Figure 5:
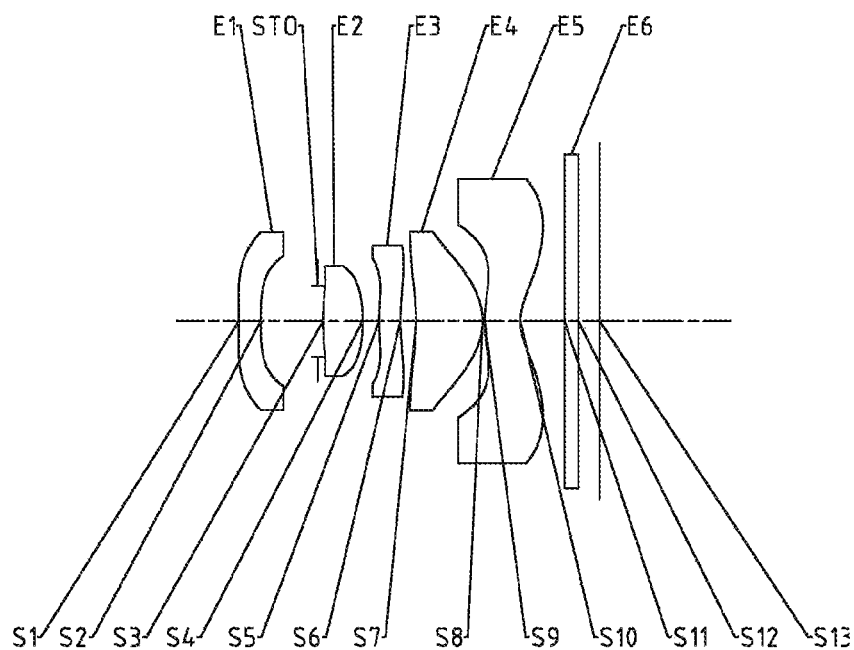
FIG. 5 illustrates a schematic structural view of an optical imaging lens assembly according to example 3 of the present disclosure.

An optical imaging lens assembly according to example 3 of the present disclosure is described below with reference to FIG. 5 to FIG. 6D. FIG. 5 shows a schematic structural view of the optical imaging lens assembly according to example 3 of the present disclosure.

As shown in FIG. 5, the optical imaging lens assembly includes a first lens E1, a stop STO, a second lens E2, a third lens E3, a fourth lens E4, a fifth lens E5, an optical filter E6 and an imaging plane S13, which are sequentially arranged from an object side to an image side along an optical axis.

The first lens E1 has negative refractive power, an object-side surface S1 thereof is concave, and an image-side surface S2 thereof is concave. The second lens E2 has positive refractive power, an object-side surface S3 thereof is convex, and an image-side surface S4 thereof is convex. The third lens E3 has positive refractive power, an object-side surface S5 thereof is convex, and an image-side surface S6 thereof is concave. The fourth lens E4 has positive refractive power, an object-side surface S7 thereof is concave, and an image-side surface S8 thereof is convex. The fifth lens E5 has negative refractive power, an object-side surface S9 thereof is convex, and an image-side surface S10 thereof is concave. The optical filter E6 has an object-side surface S11 and an image-side surface S12. Light from an object sequentially passes through the respective surfaces S1 to S12 and is finally imaged on the imaging plane S13.

Table 5 is a table illustrating basic parameters of the optical imaging lens assembly of example 3, wherein the units for the radius of curvature, the thickness and the focal length are millimeter (mm). Table 6 shows high-order coefficients applicable to each aspheric surface in example 3, wherein the surface shape of each aspheric surface may be defined by the formula (1) given in the above example 1.

TABLE 5

Example 3: f = 2.21 mm, TTL = 5.42 mm, ImgH = 2.70 mm, f/EPD = 2.29

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| S1 | Aspheric | −8.127 | 0.3295 | 1.55 | 56.1 | −8.36 | −46.9289 |
| S2 | Aspheric | 10.5618 | 0.8602 | | | | −63.5586 |
| STO | Spherical | Infinite | 0.0765 | | | | |
| S3 | Aspheric | 3.8166 | 0.5939 | 1.55 | 56.1 | 3.02 | −43.4598 |
| S4 | Aspheric | −2.7466 | 0.2488 | | | | 4.8287 |
| S5 | Aspheric | 3.4859 | 0.3193 | 1.67 | 20.3 | 98.98 | −7.0129 |
| S6 | Aspheric | 3.5456 | 0.2341 | | | | −0.0875 |
| S7 | Aspheric | −3.0636 | 1.0013 | 1.55 | 56.1 | 2.05 | −11.8530 |
| S8 | Aspheric | −0.9154 | 0.0280 | | | | −0.9594 |
| S9 | Aspheric | 1.8169 | 0.5374 | 1.67 | 20.3 | −2.43 | −3.6630 |
| S10 | Aspheric | 0.7547 | 0.6625 | | | | −3.3848 |
| S11 | Spherical | Infinite | 0.2100 | 1.52 | 64.2 | | |
| S12 | Spherical | Infinite | 0.3107 | | | | |
| S13 | Spherical | Infinite | | | | | |

TABLE 6

| Surface number | A4 | A6 | A8 | A10 | A12 | A14 | A16 | A18 | A20 |
|---|---|---|---|---|---|---|---|---|---|
| S1 | 2.5467E−01 | −2.5324E−01 | 3.6289E−01 | −4.6739E−01 | 4.6604E−01 | −3.2314E−01 | 1.4383E−01 | −3.6682E−02 | 4.0315E−03 |
| S2 | 3.6518E−01 | −3.7931E−01 | 1.2085E+00 | −3.4200E+00 | 7.2672E+00 | −1.0063E+01 | 8.5742E+00 | −4.0185E+00 | 7.7845E−01 |
| S3 | 4.2264E−02 | −3.6362E−01 | 3.2051E+00 | −3.6225E+01 | 2.3812E+02 | −9.4440E+02 | 2.2050E+03 | −2.8046E+03 | 1.4883E+03 |
| S4 | −2.1853E−01 | −1.5809E−02 | 7.2784E−01 | −3.5587E+00 | 5.9217E+00 | 3.3414E+00 | −2.9928E+01 | 4.3431E+01 | −2.1856E+01 |
| S5 | −2.7022E−01 | −1.6860E−01 | 6.5822E−01 | −1.3464E+00 | 1.4028E+00 | 3.8110E−01 | −2.2665E+00 | 1.6842E+00 | −3.3395E−01 |
| S6 | −4.3228E−02 | −5.4601E−01 | 1.6786E+00 | −3.0711E+00 | 3.6749E+00 | −2.6793E+00 | 1.0317E+00 | −1.3599E−01 | −1.3044E−02 |
| S7 | 1.8916E−01 | −6.0202E−01 | 1.2090E+00 | −1.1746E+00 | 1.4721E−01 | 8.7700E−01 | −9.2963E−01 | 4.0501E−01 | −6.7712E−02 |
| S8 | 1.9360E−01 | −3.9578E−01 | 8.1460E−01 | −1.2679E+00 | 1.4220E+00 | −1.0577E+00 | 4.8249E−01 | −1.2022E−01 | 1.2379E−02 |
| S9 | −3.0043E−01 | 1.4847E−02 | 2.4120E−01 | −3.3721E−01 | 2.3396E−01 | −8.8210E−02 | 1.0779E−02 | 3.6226E−03 | −1.0070E−03 |
| S10 | −2.3630E−01 | 2.0968E−01 | −1.4094E−01 | 6.8586E−02 | −2.3819E−02 | 5.6925E−03 | −8.8443E−04 | 8.0196E−05 | −3.2185E−06 |

Figures 6A, 6B:
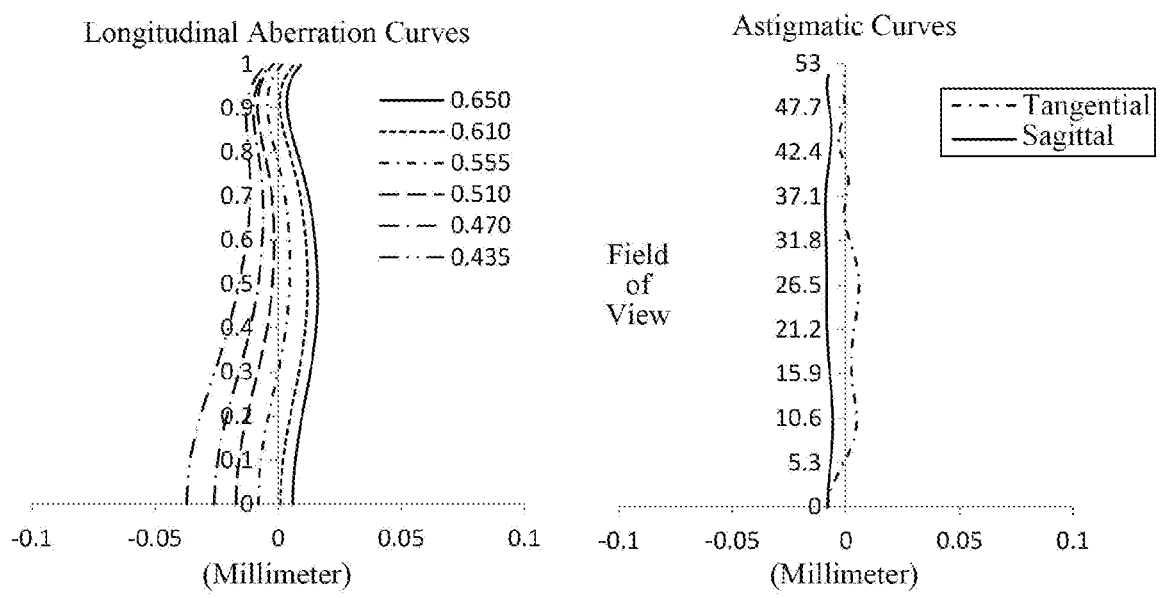
FIGS. 6A to 6D illustrate longitudinal aberration curves, astigmatic curves, a distortion curve, and a lateral color curve of the optical imaging lens assembly of the example 3, respectively.
Figure 6C:
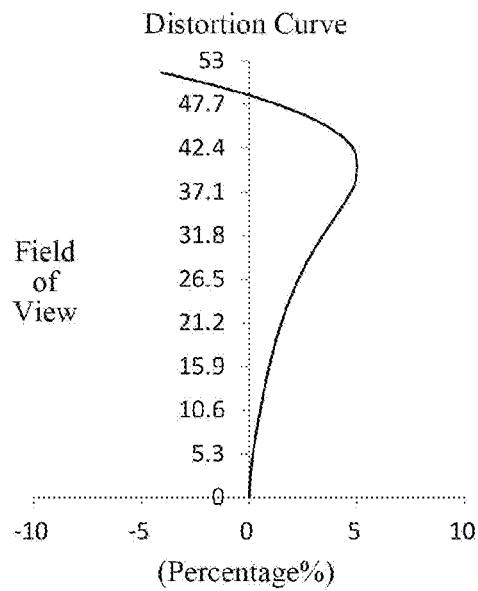
Figure 6D:
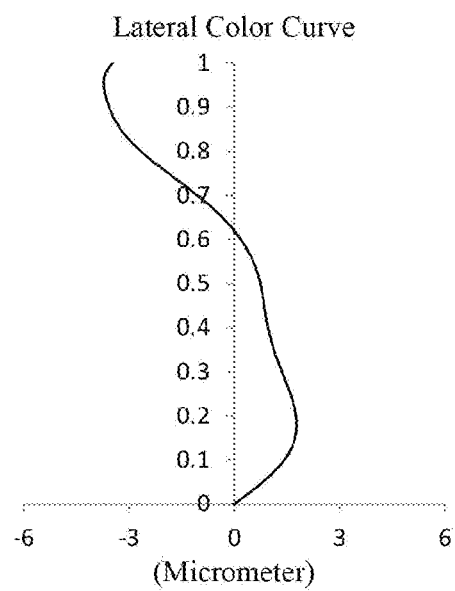

FIG. 6A illustrates longitudinal aberration curves of the optical imaging lens assembly according to example 3, representing the deviations of focal points converged by light of different wavelengths after passing through the lens assembly. FIG. 6B illustrates astigmatic curves of the optical imaging lens assembly according to example 3, representing the curvatures of a tangential plane and the curvatures of a sagittal plane. FIG. 6C illustrates a distortion curve of the optical imaging lens assembly according to example 3, representing the amounts of distortion corresponding to different field-of-views. FIG. 6D illustrates a lateral color curve of the optical imaging lens assembly according to example 3, representing the deviations of different image heights on an imaging plane after light passes through the lens assembly. It can be seen from FIG. 6A to FIG. 6D that the optical imaging lens assembly provided in example 3 may achieve good image quality.

Example 4

Figure 7:
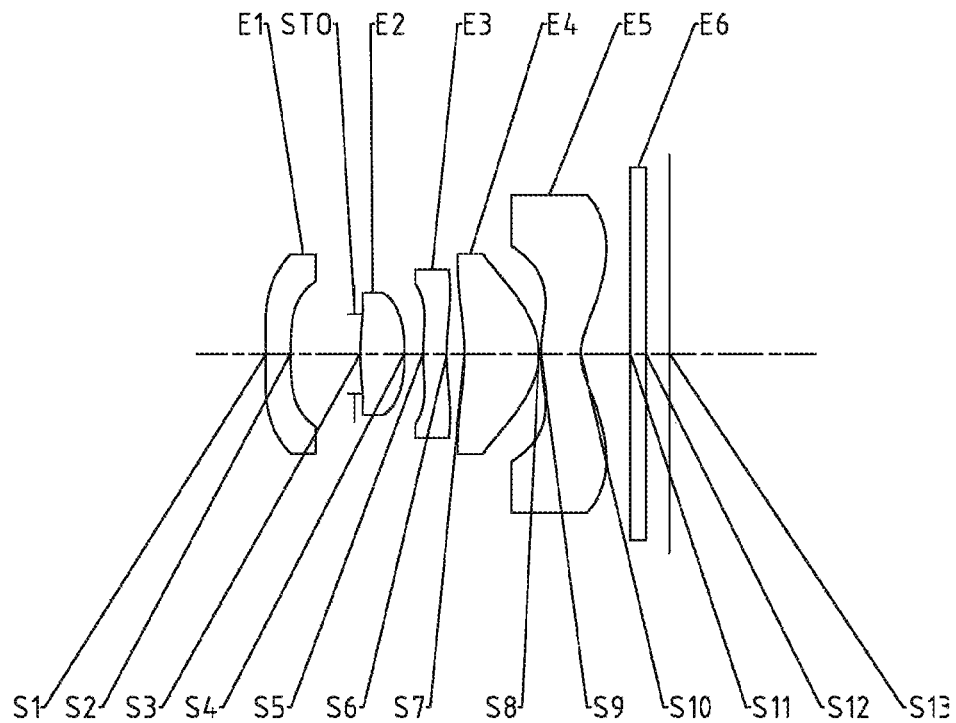
FIG. 7 illustrates a schematic structural view of an optical imaging lens assembly according to example 4 of the present disclosure.

An optical imaging lens assembly according to example 4 of the present disclosure is described below with reference to FIG. 7 to FIG. 8D. FIG. 7 shows a schematic structural view of the optical imaging lens assembly according to example 4 of the present disclosure.

As shown in FIG. 7, the optical imaging lens assembly includes a first lens E1, a stop STO, a second lens E2, a third lens E3, a fourth lens E4, a fifth lens E5, an optical filter E6 and an imaging plane S13, which are sequentially arranged from an object side to an image side along an optical axis.

The first lens E1 has negative refractive power, an object-side surface S1 thereof is concave, and an image-side surface S2 thereof is concave. The second lens E2 has positive refractive power, an object-side surface S3 thereof is convex, and an image-side surface S4 thereof is convex. The third lens E3 has positive refractive power, an object-side surface S5 thereof is convex, and an image-side surface S6 thereof is convex. The fourth lens E4 has positive refractive power, an object-side surface S7 thereof is concave, and an image-side surface S8 thereof is convex. The fifth lens E5 has negative refractive power, an object-side surface S9 thereof is convex, and an image-side surface S10 thereof is concave. The optical filter E6 has an object-side surface S11 and an image-side surface S12. Light from an object sequentially passes through the respective surfaces S1 to S12 and is finally imaged on the imaging plane S13.

Table 7 is a table illustrating basic parameters of the optical imaging lens assembly of example 4, wherein the units for the radius of curvature, the thickness and the focal length are millimeter (mm). Table 8 shows high-order coefficients applicable to each aspheric surface in example 4, wherein the surface shape of each aspheric surface may be defined by the formula (1) given in the above example 1.

TABLE 7

Example 4: f = 2.21 mm, TTL = 5.47 mm, ImgH = 2.70 mm, f/EPD = 2.29

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| S1 | Aspheric | −8.184 | 0.3289 | 1.55 | 56.1 | −7.92 | −52.9162 |
| S2 | Aspheric | 9.2863 | 0.8611 | | | | −36.9066 |
| STO | Spherical | Infinite | 0.0794 | | | | |
| S3 | Aspheric | 4.2238 | 0.6103 | 1.55 | 56.1 | 2.82 | −60.4636 |
| S4 | Aspheric | −2.2980 | 0.2601 | | | | 2.2870 |
| S5 | Aspheric | 197.5863 | 0.2684 | 1.67 | 20.3 | 99.00 | −99.0000 |
| S6 | Aspheric | −99.0000 | 0.3064 | | | | −99.0000 |
| S7 | Aspheric | −2.3501 | 0.9086 | 1.55 | 56.1 | 2.27 | −7.6897 |
| S8 | Aspheric | −0.9209 | 0.0280 | | | | −0.9708 |
| S9 | Aspheric | 1.6228 | 0.5293 | 1.67 | 20.3 | −2.68 | −2.9867 |
| S10 | Aspheric | 0.7388 | 0.7112 | | | | −3.2862 |
| S11 | Spherical | Infinite | 0.2100 | 1.52 | 64.2 | | |
| S12 | Spherical | Infinite | 0.3594 | | | | |
| S13 | Spherical | Infinite | | | | | |

TABLE 8

| Surface number | A4 | A6 | A8 | A10 | A12 | A14 | A16 | A18 | A20 |
|---|---|---|---|---|---|---|---|---|---|
| S1 | 2.6002E−01 | −2.6004E−01 | 3.4196E−01 | −4.0057E−01 | 3.7133E−01 | −2.4584E−01 | 1.0653E−01 | −2.6821E−02 | 2.9386E−03 |
| S2 | 3.7089E−01 | −3.3734E−01 | 8.2250E−01 | −1.9374E+00 | 3.8619E+00 | −5.1504E+00 | 4.2215E+00 | −1.8539E+00 | 3.1601E−01 |
| S3 | 4.1879E−02 | −3.4083E−01 | 2.4980E+00 | −2.9064E+01 | 1.9633E+02 | −7.9694E+02 | 1.8958E+03 | −2.4524E+03 | 1.3196E+03 |
| S4 | −1.6602E−01 | −1.6797E−01 | 9.1586E−01 | −2.7011E+00 | −1.0961E+00 | 2.6277E+01 | −7.0188E+01 | 8.0142E+01 | −3.5522E+01 |
| S5 | −2.5978E−01 | −1.8600E−01 | −6.4436E−02 | 3.4619E+00 | −1.4607E+01 | 3.2167E+01 | −3.9495E+01 | 2.5027E+01 | −6.2936E+00 |
| S6 | −3.9646E−02 | −5.6270E−01 | 1.9217E+00 | −3.9966E+00 | 5.5619E+00 | −4.8456E+00 | 2.3939E+00 | −5.6280E−01 | 3.7549E−02 |
| S7 | 1.9233E−01 | −6.8453E−01 | 1.6705E+00 | −2.5444E+00 | 2.5269E+00 | −1.6376E+00 | 6.6191E−01 | −1.4961E−01 | 1.4196E−02 |
| S8 | 1.8141E−01 | −3.2465E−01 | 5.5882E−01 | −6.8116E−01 | 5.9805E−01 | −3.5764E−01 | 1.3311E−01 | −2.6420E−02 | 1.9649E−03 |
| S9 | −2.9123E−01 | 4.6572E−02 | 1.6437E−01 | −2.5686E−01 | 1.8973E−01 | −8.2879E−02 | 2.0687E−02 | −2.2236E−03 | −7.0476E−06 |
| S10 | −1.9733E−01 | 1.6510E−01 | −1.0732E−01 | 5.0308E−02 | −1.6711E−02 | 3.8166E−03 | −5.6857E−04 | 4.9697E−05 | −1.9326E−06 |

Figure 8A:
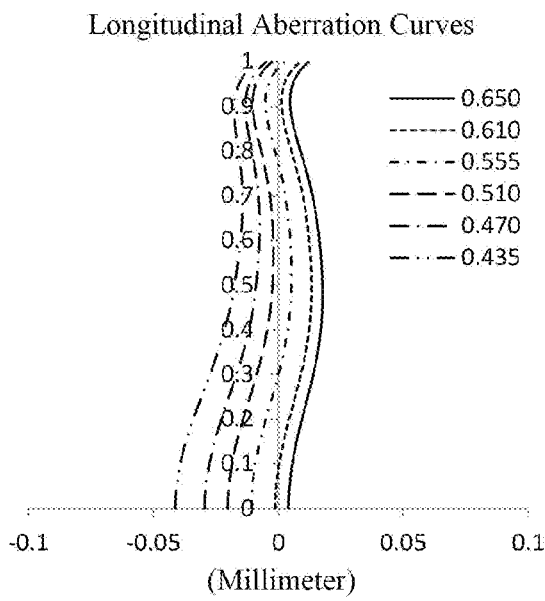
FIGS. 8A to 8D illustrate longitudinal aberration curves, astigmatic curves, a distortion curve, and a lateral color curve of the optical imaging lens assembly of the example 4, respectively.
Figure 8B:
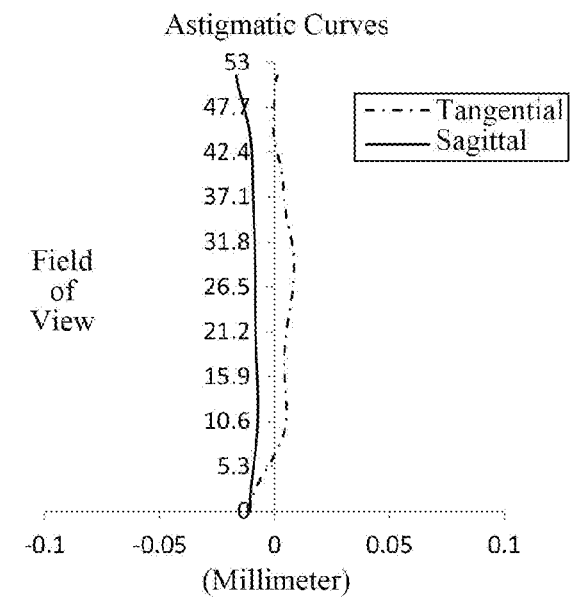
Figure 8C:
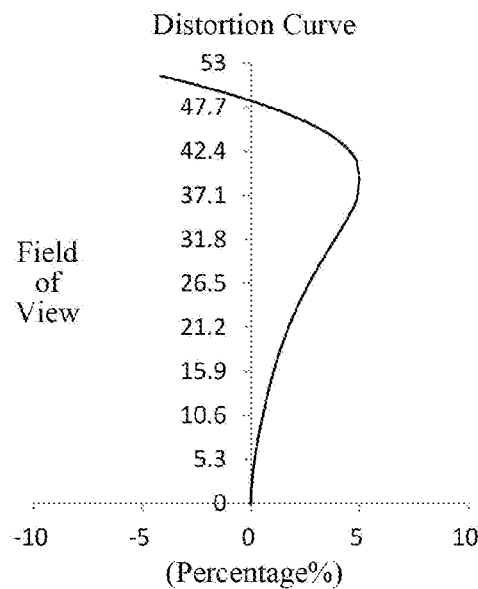
Figure 8D:
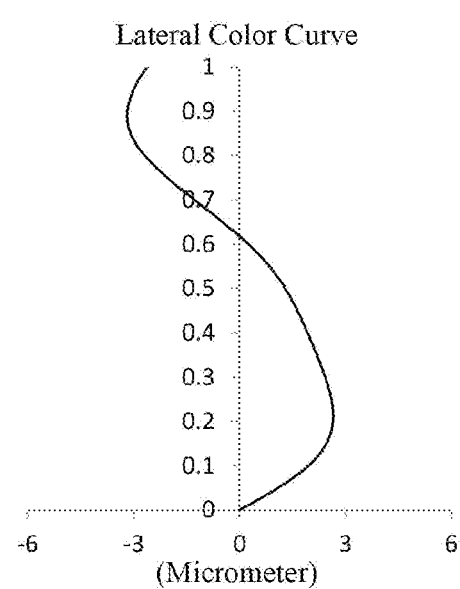

FIG. 8A illustrates longitudinal aberration curves of the optical imaging lens assembly according to example 4, representing the deviations of focal points converged by light of different wavelengths after passing through the lens assembly. FIG. 8B illustrates astigmatic curves of the optical imaging lens assembly according to example 4, representing the curvatures of a tangential plane and the curvatures of a sagittal plane. FIG. 8C illustrates a distortion curve of the optical imaging lens assembly according to example 4, representing the amounts of distortion corresponding to different field-of-views. FIG. 8D illustrates a lateral color curve of the optical imaging lens assembly according to example 4, representing the deviations of different image heights on an imaging plane after light passes through the lens assembly. It can be seen from FIG. 8A to FIG. 8D that the optical imaging lens assembly provided in example 4 may achieve good image quality.

Example 5

Figure 9:
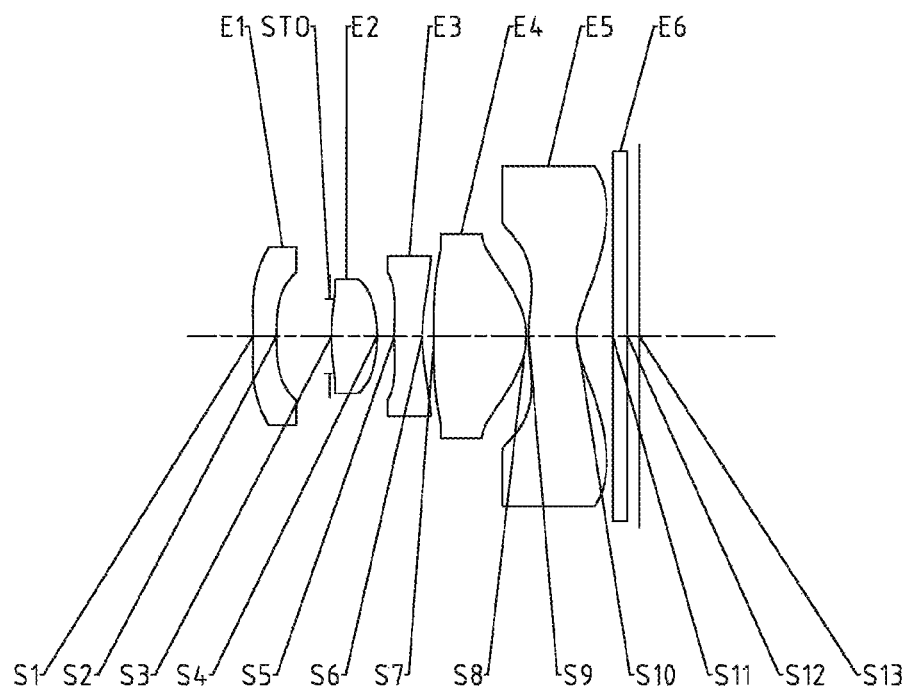
FIG. 9 illustrates a schematic structural view of an optical imaging lens assembly according to example 5 of the present disclosure.

An optical imaging lens assembly according to example 5 of the present disclosure is described below with reference to FIG. 9 to FIG. 10D. FIG. 9 shows a schematic structural view of the optical imaging lens assembly according to example 5 of the present disclosure.

As shown in FIG. 9, the optical imaging lens assembly includes a first lens E1, a stop STO, a second lens E2, a third lens E3, a fourth lens E4, a fifth lens E5, an optical filter E6 and an imaging plane S13, which are sequentially arranged from an object side to an image side along an optical axis.

The first lens E1 has negative refractive power, an object-side surface S1 thereof is concave, and an image-side surface S2 thereof is concave. The second lens E2 has positive refractive power, an object-side surface S3 thereof is convex, and an image-side surface S4 thereof is convex. The third lens E3 has negative refractive power, an object-side surface S5 thereof is convex, and an image-side surface S6 thereof is concave. The fourth lens E4 has positive refractive power, an object-side surface S7 thereof is convex, and an image-side surface S8 thereof is convex. The fifth lens E5 has negative refractive power, an object-side surface S9 thereof is convex, and an image-side surface S10 thereof is concave. The optical filter E6 has an object-side surface S11 and an image-side surface S12. Light from an object sequentially passes through the respective surfaces S1 to S12 and is finally imaged on the imaging plane S13.

Table 9 is a table illustrating basic parameters of the optical imaging lens assembly of example 5, wherein the units for the radius of curvature, the thickness and the focal length are millimeter (mm). Table 10 shows high-order coefficients applicable to each aspheric surface in example 5, wherein the surface shape of each aspheric surface may be defined by the formula (1) given in the above example 1.

TABLE 9

Example 5: f = 2.14 mm, TTL = 5.47 mm, ImgH = 2.70 mm, f/EPD = 2.29

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| S1 | Aspheric | −9.066 | 0.3286 | 1.55 | 56.1 | −6.35 | −28.4049 |
| S2 | Aspheric | 5.6790 | 0.7526 | | | | −4.3916 |
| STO | Spherical | Infinite | 0.0287 | | | | |
| S3 | Aspheric | 2.9773 | 0.6459 | 1.55 | 56.1 | 2.40 | −11.9703 |
| S4 | Aspheric | −2.1568 | 0.2449 | | | | 1.3688 |
| S5 | Aspheric | 5.5688 | 0.3944 | 1.67 | 20.3 | −6.67 | 0.9420 |
| S6 | Aspheric | 2.4028 | 0.1657 | | | | 0.0085 |
| S7 | Aspheric | 100.0000 | 1.3087 | 1.55 | 56.1 | 1.78 | 99.0000 |
| S8 | Aspheric | −0.9775 | 0.0338 | | | | −1.0527 |
| S9 | Aspheric | 2.7099 | 0.6798 | 1.67 | 20.3 | −2.05 | 0.4690 |
| S10 | Aspheric | 0.8165 | 0.5118 | | | | −3.4566 |
| S11 | Spherical | Infinite | 0.2100 | 1.52 | 64.2 | | |
| S12 | Spherical | Infinite | 0.1600 | | | | |
| S13 | Spherical | Infinite | | | | | |

TABLE 10

| Surface number | A4 | A6 | A8 | A10 | A12 | A14 | A16 | A18 | A20 |
|---|---|---|---|---|---|---|---|---|---|
| S1 | 2.6065E−01 | −2.7544E−01 | 4.1656E−01 | −5.9868E−01 | 6.6852E−01 | −5.1886E−01 | 2.5786E−01 | −7.3610E−02 | 9.1336E−03 |
| S2 | 3.8230E−01 | −4.7289E−01 | 2.0666E+00 | −7.7189E+00 | 2.0478E+01 | −3.5132E+01 | 3.7325E+01 | −2.2258E+01 | 5.6456E+00 |
| S3 | 2.4979E−02 | −1.3034E−01 | 4.7853E−01 | −8.6331E+00 | 6.6424E+01 | −2.9808E+02 | 7.6476E+02 | −1.0475E+03 | 5.7663E+02 |
| S4 | −1.6764E−01 | −1.3600E−02 | 6.6725E−01 | −4.3545E+00 | 1.2182E+01 | −1.7463E+01 | 5.6838E+00 | 1.3385E+01 | −1.2357E+01 |
| S5 | −2.8198E−01 | −2.3083E−01 | 2.0360E+00 | −7.3413E+00 | 1.5436E+01 | −1.8849E+01 | 1.1648E+01 | −1.7789E+00 | −9.8486E−01 |
| S6 | −8.1440E−02 | −5.7035E−01 | 2.4059E+00 | −5.5353E+00 | 8.1246E+00 | −7.7002E+00 | 4.5513E+00 | −1.5194E+00 | 2.1695E−01 |
| S7 | 1.7361E−01 | −5.8222E−01 | 1.3840E+00 | −1.9900E+00 | 1.7311E+00 | −8.5863E−01 | 1.8677E−01 | 1.2723E−02 | −9.7010E−03 |
| S8 | 1.9744E−01 | −4.0281E−01 | 8.1315E−01 | −1.1755E+00 | 1.1804E+00 | −7.7750E−01 | 3.1726E−01 | −7.2280E−02 | 6.9970E−03 |
| S9 | −2.2144E−01 | −9.3320E−02 | 3.8436E−01 | −5.3316E−01 | 4.5056E−01 | −2.4599E−01 | 8.3020E−02 | −1.5506E−02 | 1.2172E−03 |
| S10 | −1.7063E−01 | 1.3564E−01 | −8.0814E−02 | 3.5110E−02 | −1.0776E−02 | 2.2342E−03 | −2.9509E−04 | 2.2304E−05 | −7.3280E−07 |

Figures 10A, 10B:
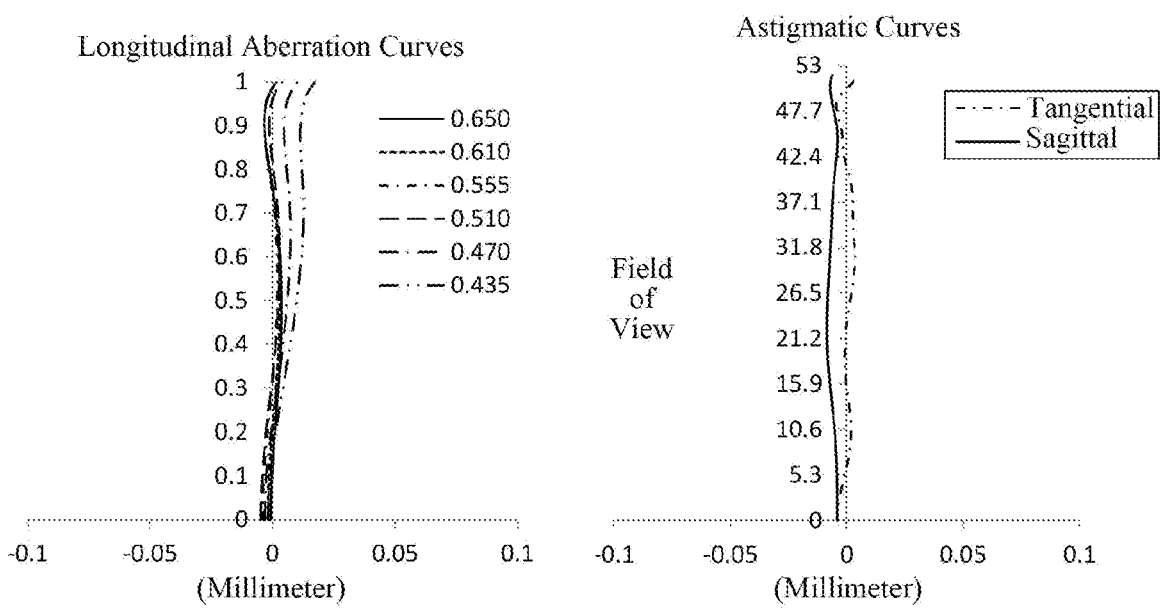
FIGS. 10A to 10D illustrate longitudinal aberration curves, astigmatic curves, a distortion curve, and a lateral color curve of the optical imaging lens assembly of the example 5, respectively.
Figures 10C, 10D:
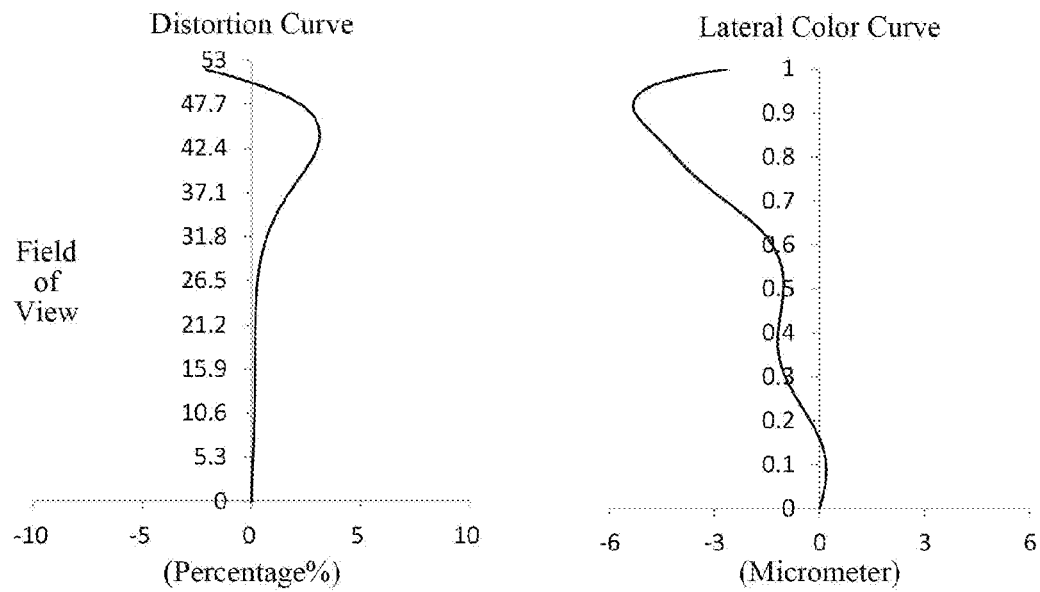

FIG. 10A illustrates longitudinal aberration curves of the optical imaging lens assembly according to example 5, representing the deviations of focal points converged by light of different wavelengths after passing through the lens assembly. FIG. 10B illustrates astigmatic curves of the optical imaging lens assembly according to example 5, representing the curvatures of a tangential plane and the curvatures of a sagittal plane. FIG. 10C illustrates a distortion curve of the optical imaging lens assembly according to example 5, representing the amounts of distortion corresponding to different field-of-views. FIG. 10D illustrates a lateral color curve of the optical imaging lens assembly according to example 5, representing the deviations of different image heights on an imaging plane after light passes through the lens assembly. It can be seen from FIG. 10A to FIG. 10D that the optical imaging lens assembly provided in example 5 may achieve good image quality.

Example 6

Figure 11:
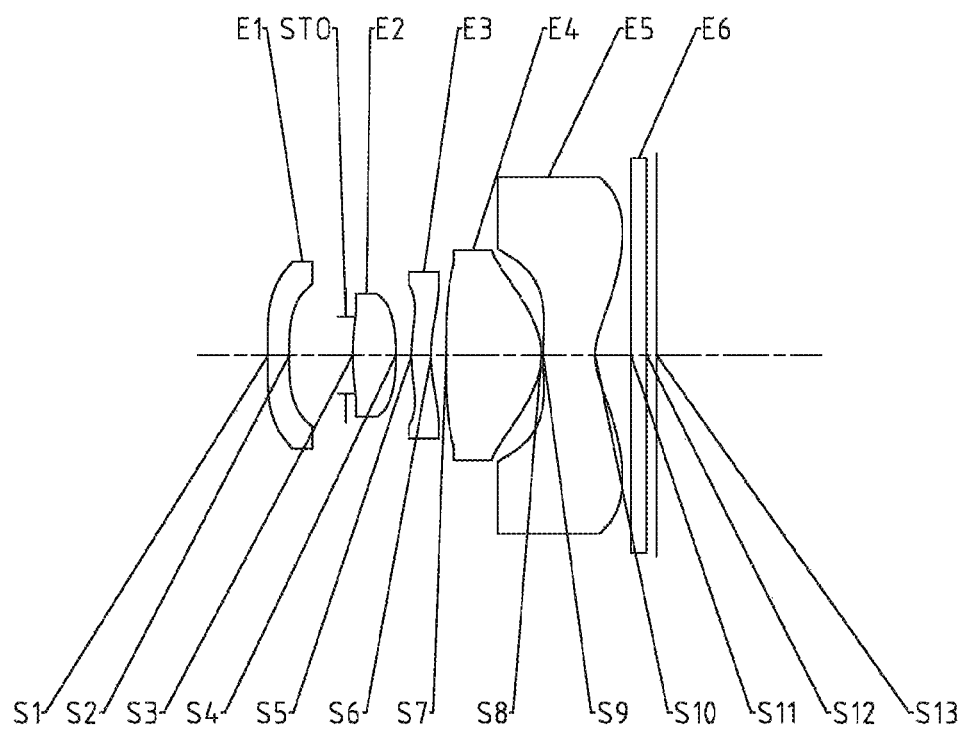
FIG. 11 illustrates a schematic structural view of an optical imaging lens assembly according to example 6 of the present disclosure.

An optical imaging lens assembly according to example 6 of the present disclosure is described below with reference to FIG. 11 to FIG. 12D. FIG. 11 shows a schematic structural view of the optical imaging lens assembly according to example 6 of the present disclosure.

As shown in FIG. 11, the optical imaging lens assembly includes a first lens E1, a stop STO, a second lens E2, a third lens E3, a fourth lens E4, a fifth lens E5, an optical filter E6 and an imaging plane S13, which are sequentially arranged from an object side to an image side along an optical axis.

The first lens E1 has negative refractive power, an object-side surface S1 thereof is concave, and an image-side surface S2 thereof is concave. The second lens E2 has positive refractive power, an object-side surface S3 thereof is convex, and an image-side surface S4 thereof is convex. The third lens E3 has positive refractive power, an object-side surface S5 thereof is convex, and an image-side surface S6 thereof is concave. The fourth lens E4 has positive refractive power, an object-side surface S7 thereof is convex, and an image-side surface S8 thereof is convex. The fifth lens E5 has negative refractive power, an object-side surface S9 thereof is convex, and an image-side surface S10 thereof is concave. The optical filter E6 has an object-side surface S11 and an image-side surface S12. Light from an object sequentially passes through the respective surfaces S1 to S12 and is finally imaged on the imaging plane S13.

Table 11 is a table illustrating basic parameters of the optical imaging lens assembly of example 6, wherein the units for the radius of curvature, the thickness and the focal length are millimeter (mm). Table 12 shows high-order coefficients applicable to each aspheric surface in example 6, wherein the surface shape of each aspheric surface may be defined by the formula (1) given in the above example 1.

TABLE 11

Example 6: f = 2.20 mm, TTL = 5.19 mm, ImgH = 2.70 mm, f/EPD = 2.29

| Surface number | Surface type | Radius of curvature | Thickness/ Distance | Refractive index | Abbe number | Focal length | Conic coefficient |
|---|---|---|---|---|---|---|---|
| OBJ | Spherical | Infinite | Infinite | | | | |
| S1 | Aspheric | −15.289 | 0.2830 | 1.55 | 56.1 | −10.70 | −77.9496 |
| S2 | Aspheric | 9.5185 | 0.7513 | | | | −71.1466 |
| STO | Spherical | Infinite | 0.0965 | | | | |
| S3 | Aspheric | 3.3731 | 0.5746 | 1.55 | 56.1 | 3.40 | −23.8633 |
| S4 | Aspheric | −3.8720 | 0.2095 | | | | 19.3888 |
| S5 | Aspheric | 2.1206 | 0.2607 | 1.67 | 20.3 | 99.00 | −2.8034 |
| S6 | Aspheric | 2.0833 | 0.2011 | | | | −3.3657 |
| S7 | Aspheric | 100.0000 | 1.2697 | 1.55 | 56.1 | 1.72 | −99.0000 |
| S8 | Aspheric | −0.9430 | 0.0280 | | | | −1.1647 |
| S9 | Aspheric | 4.8533 | 0.6908 | 1.67 | 20.3 | | −19.6386 |
| S10 | Aspheric | 0.8332 | 0.4774 | | | −1.62 | −3.8583 |
| S11 | Spherical | Infinite | 0.2100 | 1.52 | 64.2 | | |
| S12 | Spherical | Infinite | 0.1249 | | | | |
| S13 | Spherical | Infinite | | | | | |

TABLE 12

| Surface number | A4 | A6 | A8 | A10 | A12 | A14 | A16 | A18 | A20 |
|---|---|---|---|---|---|---|---|---|---|
| S1 | 2.5565E−01 | −2.2694E−01 | 3.6869E−01 | −5.8253E−01 | 7.4350E−01 | −6.6270E−01 | 3.7889E−01 | −1.2379E−01 | 1.7274E−02 |
| S2 | 3.5861E−01 | −3.4485E−01 | 1.2914E+00 | −4.3584E+00 | 1.1080E+01 | −1.8395E+01 | 1.8914E+01 | −1.0813E+01 | 2.5867E+00 |
| S3 | 3.6207E−02 | −4.5606E−02 | −1.6571E+00 | 1.3995E+01 | −7.6220E+01 | 2.6116E+02 | −5.7390E+02 | 7.4094E+02 | −4.3849E+02 |
| S4 | −2.2734E−01 | 4.8309E−02 | 9.1362E−01 | −5.8132E+00 | 1.6783E+01 | −2.6484E+01 | 1.8720E+01 | 2.9346E−01 | −5.6080E+00 |
| S5 | −2.7098E−01 | −2.7603E−01 | 1.3846E+00 | −3.7471E+00 | 5.6403E+00 | −3.5406E+00 | −1.4157E+00 | 3.2719E+00 | −1.3557E+00 |
| S6 | −3.3450E−02 | −7.0011E−01 | 2.5321E+00 | −5.7414E+00 | 8.7464E+00 | −8.7561E+00 | 5.5067E+00 | −1.9655E+00 | 3.0127E−01 |
| S7 | 1.2815E−01 | −4.0869E−01 | 1.0344E+00 | −1.5358E+00 | 1.3814E+00 | −7.4830E−01 | 2.2261E−01 | −2.5265E−02 | −1.3380E−03 |
| S8 | 1.8195E−01 | −3.3287E−01 | 5.8238E−01 | −6.7813E−01 | 4.9780E−01 | −1.9483E−01 | 1.6719E−02 | 1.3076E−02 | −3.1870E−03 |
| S9 | −2.7518E−01 | 6.3300E−02 | −4.4037E−03 | 2.6523E−01 | −6.5728E−01 | 6.9811E−01 | −3.9502E−01 | 1.1618E−01 | −1.3894E−02 |
| S10 | −1.9266E−01 | 1.6868E−01 | −1.0477E−01 | 4.5070E−02 | −1.3342E−02 | 2.6601E−03 | −3.4179E−04 | 2.5554E−05 | −8.4344E−07 |

Figure 12A:
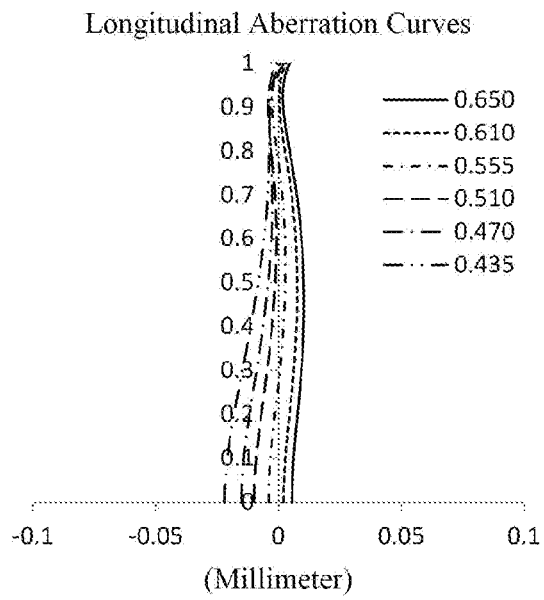
FIGS. 12A to 12D illustrate longitudinal aberration curves, astigmatic curves, a distortion curve, and a lateral color curve of the optical imaging lens assembly of the example 6, respectively.
Figure 12B:
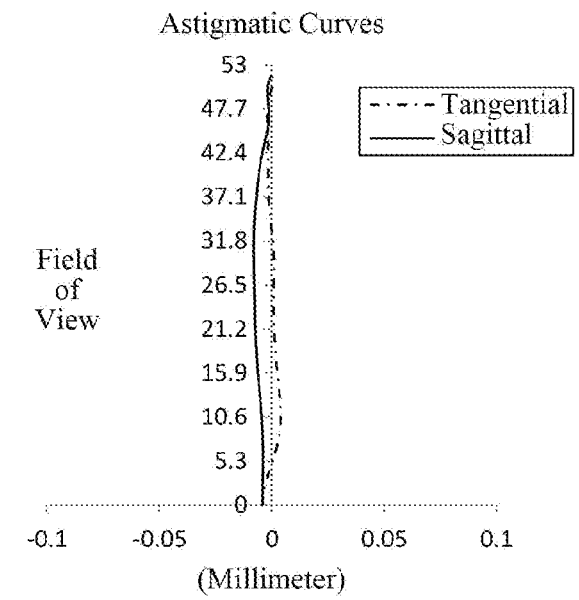
Figure 12C:
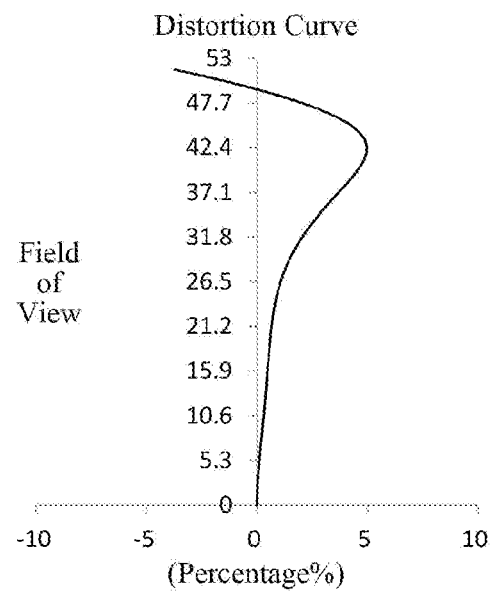
Figure 12D:
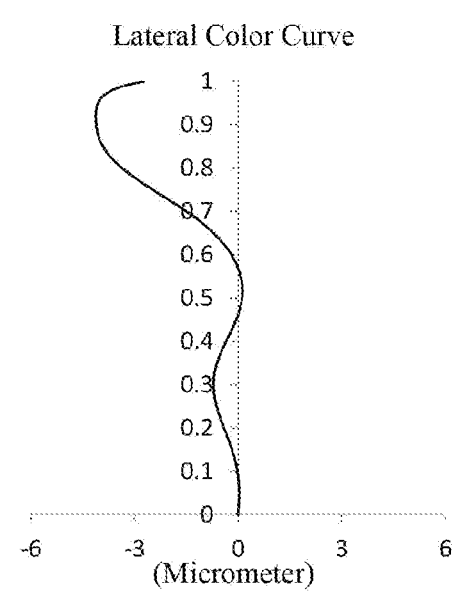

FIG. 12A illustrates longitudinal aberration curves of the optical imaging lens assembly according to example 6, representing the deviations of focal points converged by light of different wavelengths after passing through the lens assembly. FIG. 12B illustrates astigmatic curves of the optical imaging lens assembly according to example 6, representing the curvatures of a tangential plane and the curvatures of a sagittal plane. FIG. 12C illustrates a distortion curve of the optical imaging lens assembly according to example 6, representing the amounts of distortion corresponding to different field-of-views. FIG. 12D illustrates a lateral color curve of the optical imaging lens assembly according to example 6, representing the deviations of different image heights on an imaging plane after light passes through the lens assembly. It can be seen from FIG. 12A to FIG. 12D that the optical imaging lens assembly provided in example 6 may achieve good image quality.

Example 7

Figure 13:
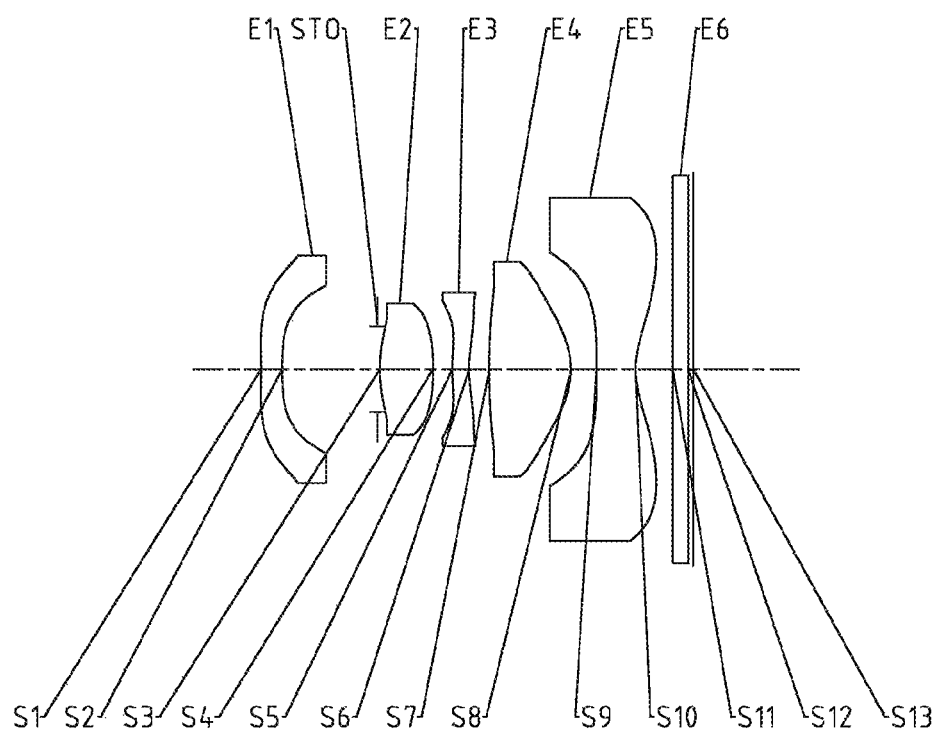
FIG. 13 illustrates a schematic structural view of an optical imaging lens assembly according to example 7 of the present disclosure.

An optical imaging lens assembly according to example 7 of the present disclosure is described below with reference to FIG. 13 to FIG. 14D. FIG. 13 shows a schematic structural view of the optical imaging lens assembly according to example 7 of the present disclosure.

As shown in FIG. 13, the optical imaging lens assembly includes a first lens E1, a stop STO, a second lens E2, a third lens E3, a fourth lens E4, a fifth lens E5, an optical filter E6 and an imaging plane S13, which are sequentially arranged from an object side to an image side along an optical axis.

The first lens E1 has negative refractive power, an object-side surface S1 thereof is concave, and an image-side surface S2 thereof is concave. The second lens E2 has positive refractive power, an object-side surface S3 thereof is convex, and an image-side surface S4 thereof is convex. The third lens E3 has negative refractive power, an object-side surface S5 thereof is convex, and an image-side surface S6 thereof is concave. The fourth lens E4 has positive refractive power, an object-side surface S7 thereof is convex, and an image-side surface S8 thereof is convex. The fifth lens E5 has negative refractive power, an object-side surface S9 thereof is concave, and an image-side surface S10 thereof is concave. The optical filter E6 has an object-side surface S511 and an image-side surface S12. Light from an object sequentially passes through the respective surfaces S1 to S12 and is finally imaged on the imaging plane S13.

Table 13 is a table illustrating basic parameters of the optical imaging lens assembly of example 7, wherein the units for the radius of curvature, the thickness and the focal length are millimeter (mm). Table 14 shows high-order coefficients applicable to each aspheric surface in example 7, wherein the surface shape of each aspheric surface may be defined by the formula (1) given in the above example 1.

TABLE 13

Example 7: f = 2.21 mm, TTL = 5.93 mm, ImgH = 2.70 mm, f/EPD = 2.29

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| S1 | Aspheric | −8.993 | 0.2876 | 1.55 | 56.1 | −6.30 | 4.3676 |
| S2 | Aspheric | 5.6266 | 1.3139 | | | | −30.0918 |
| STO | Spherical | Infinite | 0.0280 | | | | |
| S3 | Aspheric | 2.1821 | 0.7298 | 1.55 | 56.1 | 2.68 | −8.3865 |
| S4 | Aspheric | −3.8989 | 0.2649 | | | | 3.5856 |
| S5 | Aspheric | 3.1289 | 0.2300 | 1.67 | 20.3 | −8.44 | −36.5141 |
| S6 | Aspheric | 1.9513 | 0.2761 | | | | −1.4346 |
| S7 | Aspheric | 9.4588 | 1.1194 | 1.55 | 56.1 | 1.80 | −98.9492 |
| S8 | Aspheric | −1.0499 | 0.3498 | | | | −0.9567 |
| S9 | Aspheric | −99.0000 | 0.5342 | 1.67 | 20.3 | −1.69 | −85.1830 |
| S10 | Aspheric | 1.1421 | 0.5133 | | | | −4.8586 |
| S11 | Spherical | Infinite | 0.2100 | 1.52 | 64.2 | | |
| S12 | Spherical | Infinite | 0.0645 | | | | |
| S13 | Spherical | Infinite | | | | | |

TABLE 14

| Surface number | A4 | A6 | A8 | A10 | A12 | A14 | A16 | A18 | A20 |
|---|---|---|---|---|---|---|---|---|---|
| S1 | 2.6032E−01 | −1.9700E−01 | 1.5458E−01 | −8.0504E−02 | 1.8906E−02 | 5.1079E−03 | −4.9455E−03 | 1.2574E−03 | −1.0937E−04 |
| S2 | 3.3712E−01 | −1.5410E−01 | 1.0235E−01 | −4.5887E−02 | 3.0511E−01 | −7.1685E−01 | 7.8049E−01 | −4.0885E−01 | 8.1283E−02 |
| S3 | 7.9205E−02 | −1.4361E−01 | 4.8675E−01 | −4.4848E+00 | 2.2611E+01 | −6.8976E+01 | 1.2232E+02 | −1.1696E+02 | 4.5462E+01 |
| S4 | −2.0497E−01 | 2.3607E−01 | −1.2182E+00 | 4.1289E+00 | −1.0354E+01 | 1.7290E+01 | −1.8700E+01 | 1.1850E+01 | −3.4180E+00 |
| S5 | −3.8006E−01 | 1.4932E−01 | −5.3518E−01 | 1.4233E+00 | −2.4011E+00 | 3.3380E+00 | −3.4422E+00 | 2.1779E+00 | −5.9555E−01 |
| S6 | −4.0139E−01 | 4.5402E−01 | −7.4808E−01 | 1.3130E+00 | −1.6694E+00 | 1.5385E+00 | −9.7131E−01 | 3.7520E−01 | −6.5916E−02 |
| S7 | −1.2971E−02 | 3.1562E−02 | 1.0378E−01 | −3.6401E−01 | 5.2432E−01 | −4.4544E−01 | 2.2954E−01 | −6.6733E−02 | 8.4344E−03 |
| S8 | 1.9943E−01 | −2.5024E−01 | 3.8219E−01 | −4.1845E−01 | 3.3376E−01 | −1.8705E−01 | 6.6894E−02 | −1.3535E−02 | 1.1766E−03 |
| S9 | −1.1193E−01 | −3.8101E−02 | 1.4428E−01 | −1.3875E−01 | 4.5971E−02 | 1.3471E−02 | −1.6247E−02 | 4.9888E−03 | −5.3035E−04 |
| S10 | −1.3498E−01 | 9.6764E−02 | −4.8963E−02 | 1.6107E−02 | −3.3509E−03 | 4.1622E−04 | −2.8462E−05 | 9.0631E−07 | −8.1776E−09 |

Figures 14A, 14B:
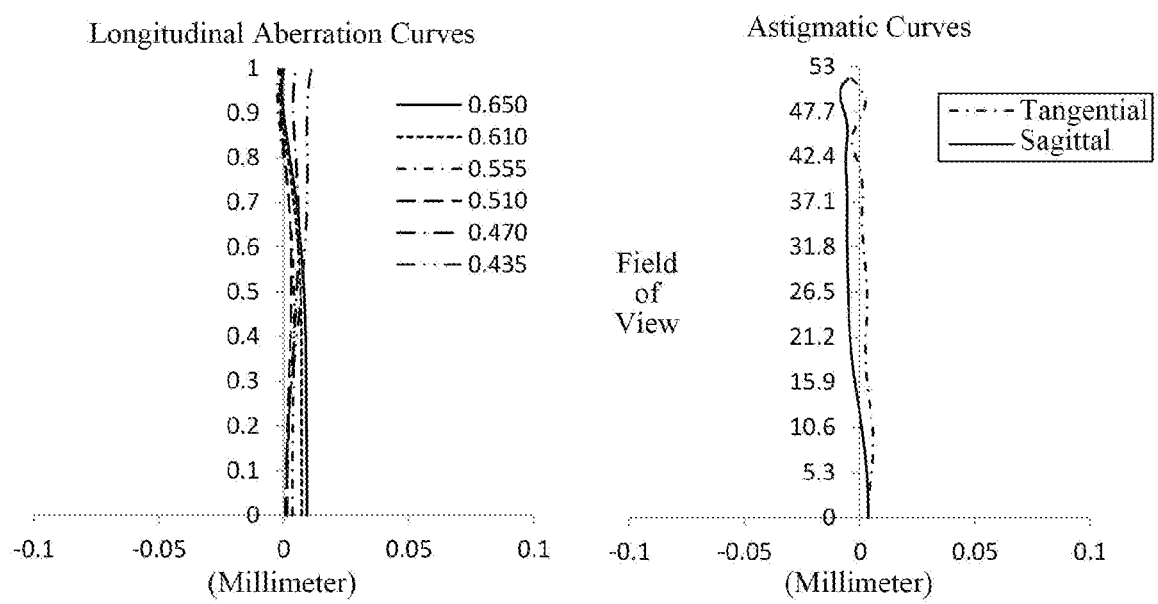
FIGS. 14A to 14D illustrate longitudinal aberration curves, astigmatic curves, a distortion curve, and a lateral color curve of the optical imaging lens assembly of the example 7, respectively.
Figure 14C:
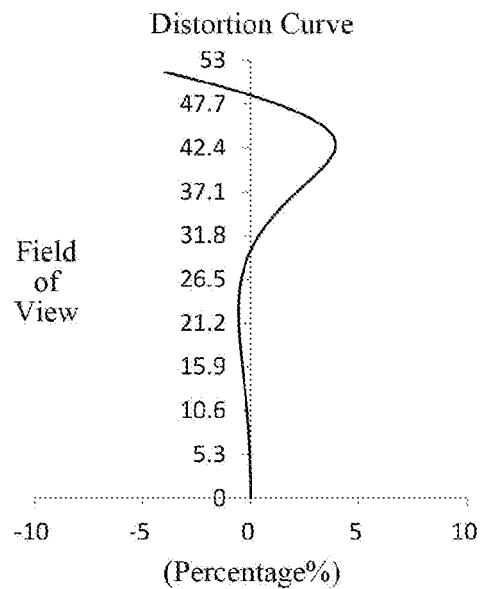
Figure 14D:
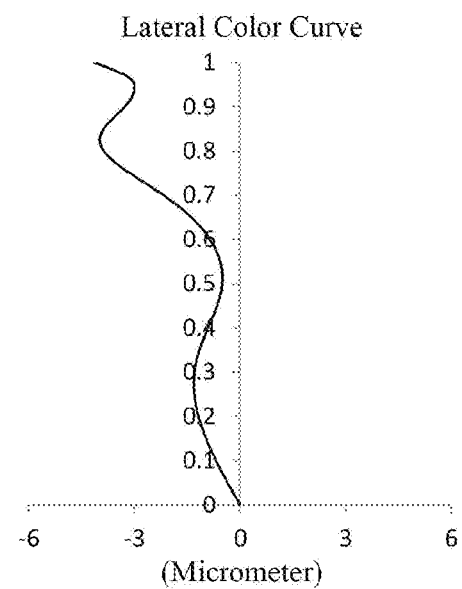

FIG. 14A illustrates longitudinal aberration curves of the optical imaging lens assembly according to example 7, representing the deviations of focal points converged by light of different wavelengths after passing through the lens assembly. FIG. 14B illustrates astigmatic curves of the optical imaging lens assembly according to example 7, representing the curvatures of a tangential plane and the curvatures of a sagittal plane. FIG. 14C illustrates a distortion curve of the optical imaging lens assembly according to example 7, representing the amounts of distortion corresponding to different field-of-views. FIG. 14D illustrates a lateral color curve of the optical imaging lens assembly according to example 7, representing the deviations of different image heights on an imaging plane after light passes through the lens assembly. It can be seen from FIG. 14A to FIG. 14D that the optical imaging lens assembly provided in example 7 may achieve good image quality.

Example 8

Figure 15:
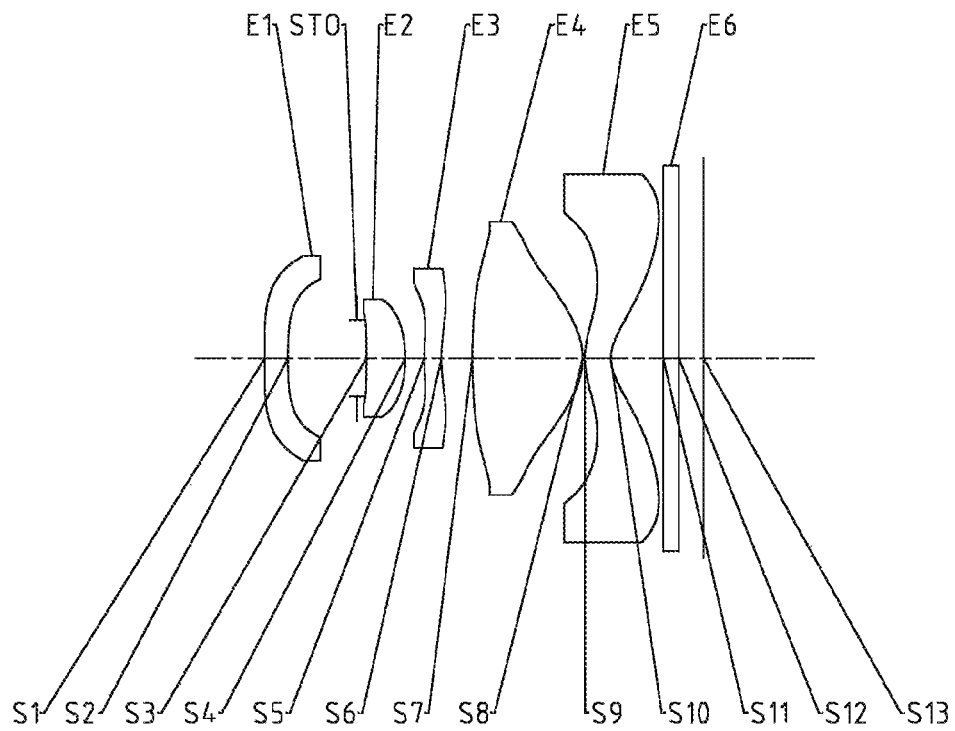
FIG. 15 illustrates a schematic structural view of an optical imaging lens assembly according to example 8 of the present disclosure.

An optical imaging lens assembly according to example 8 of the present disclosure is described below with reference to FIG. 15 to FIG. 16D. FIG. 15 shows a schematic structural view of the optical imaging lens assembly according to example 8 of the present disclosure.

As shown in FIG. 15, the optical imaging lens assembly includes a first lens E1, a stop STO, a second lens E2, a third lens E3, a fourth lens E4, a fifth lens E5, an optical filter E6 and an imaging plane S13, which are sequentially arranged from an object side to an image side along an optical axis.

The first lens E1 has negative refractive power, an object-side surface S1 thereof is concave, and an image-side surface S2 thereof is concave. The second lens E2 has positive refractive power, an object-side surface S3 thereof is concave, and an image-side surface S4 thereof is convex. The third lens E3 has negative refractive power, an object-side surface S5 thereof is convex, and an image-side surface S6 thereof is concave. The fourth lens E4 has positive refractive power, an object-side surface S7 thereof is convex, and an image-side surface S8 thereof is convex. The fifth lens E5 has negative refractive power, an object-side surface S9 thereof is convex, and an image-side surface S10 thereof is concave. The optical filter E6 has an object-side surface S11 and an image-side surface S12. Light from an object sequentially passes through the respective surfaces S1 to S12 and is finally imaged on the imaging plane S13.

Table 15 is a table illustrating basic parameters of the optical imaging lens assembly of example 8, wherein the units for the radius of curvature, the thickness and the focal length are millimeter (mm). Table 16 shows high-order coefficients applicable to each aspheric surface in example 8, wherein the surface shape of each aspheric surface may be defined by the formula (1) given in the above example 1.

TABLE 15

Example 8: f = 2.18 mm, TTL = 5.90 mm, ImgH = 2.70 mm, f/EPD = 2.29

| Surface number | Surface type | Radius of curvature | Thickness/ Distance | Refractive index | Abbe number | Focal length | Conic coefficient |
|---|---|---|---|---|---|---|---|
| OBJ | Spherical | Infinite | Infinite | | | | |
| S1 | Aspheric | −17.386 | 0.3108 | 1.55 | 56.1 | −12.17 | 28.8689 |
| S2 | Aspheric | 10.8213 | 0.9276 | | | | −91.6351 |
| STO | Spherical | Infinite | 0.1273 | | | | |
| S3 | Aspheric | −99.0000 | 0.5213 | 1.55 | 56.1 | 3.61 | 99.0000 |
| S4 | Aspheric | −1.9376 | 0.2581 | | | | 2.2843 |
| S5 | Aspheric | 3.7265 | 0.2300 | 1.67 | 20.3 | −7.94 | −75.3205 |
| S6 | Aspheric | 2.1323 | 0.4158 | | | | −10.7125 |
| S7 | Aspheric | 7.9138 | 1.4861 | 1.55 | 56.1 | 1.49 | −55.3995 |
| S8 | Aspheric | −0.8465 | 0.0280 | | | | −1.2183 |
| S9 | Aspheric | 1.0846 | 0.3496 | 1.67 | 20.3 | −1.87 | −6.6220 |
| S10 | Aspheric | 0.5050 | 0.7059 | | | | −2.6451 |
| S11 | Spherical | Infinite | 0.2100 | 1.52 | 64.2 | | |
| S12 | Spherical | Infinite | 0.3213 | | | | |
| S13 | Spherical | Infinite | | | | | |

TABLE 16

| Surface number | A4 | A6 | A8 | A10 | A12 | A14 | A16 | A18 | A20 |
|---|---|---|---|---|---|---|---|---|---|
| S1 | 2.1400E−01 | −1.1507E−01 | 1.5632E−03 | 2.5537E−01 | −4.8804E−01 | 4.9075E−01 | −2.8529E−01 | 9.0759E−02 | −1.2239E−02 |
| S2 | 2.7377E−01 | 3.0823E−03 | −8.6126E−01 | 4.0188E+00 | −9.8759E+00 | 1.4973E+01 | −1.3806E+01 | 7.1325E+00 | −1.5809E+00 |
| S3 | −1.1443E−01 | −4.3627E−01 | 4.7349E+00 | −5.2234E+01 | 3.4101E+02 | −1.3961E+03 | 3.4548E+03 | −4.7391E+03 | 2.7429E+03 |
| S4 | −2.1834E−01 | 9.3527E−02 | −5.8266E−01 | 3.3507E+00 | −1.7877E+01 | 5.7521E+01 | −1.0969E+02 | 1.1315E+02 | −4.9857E+01 |
| S5 | −2.5679E−01 | −2.5759E−01 | 1.1686E+00 | −2.9198E+00 | 4.9775E+00 | −5.4194E+00 | 3.8217E+00 | −1.6997E+00 | 3.7122E−01 |
| S6 | −2.0144E−01 | 5.6149E−02 | 2.2214E−01 | −6.4363E−01 | 9.5720E−01 | −8.7001E−01 | 4.9282E−01 | −1.6237E−01 | 2.3901E−02 |
| S7 | 2.2331E−02 | −6.9074E−02 | 1.6898E−01 | −1.9864E−01 | 1.3938E−01 | −6.1981E−02 | 1.7130E−02 | −2.6836E−03 | 1.8168E−04 |
| S8 | 3.2868E−01 | −5.5098E−01 | 6.7059E−01 | −5.7209E−01 | 3.4291E−01 | −1.3672E−01 | 3.3846E−02 | 4.6773E−03 | 2.7509E−04 |
| S9 | −7.8480E−02 | −1.6845E−01 | 2.8954E−01 | −2.3277E−01 | 1.1400E−01 | −3.5684E−02 | 6.9801E−03 | −7.8114E−04 | 3.8425E−05 |
| S10 | −1.7656E−01 | 1.1072E−01 | −4.1503E−02 | 7.1407E−03 | 6.7025E−04 | −6.0244E−04 | 1.2513E−04 | −1.1977E−05 | 4.5382E−07 |

Figure 16A:
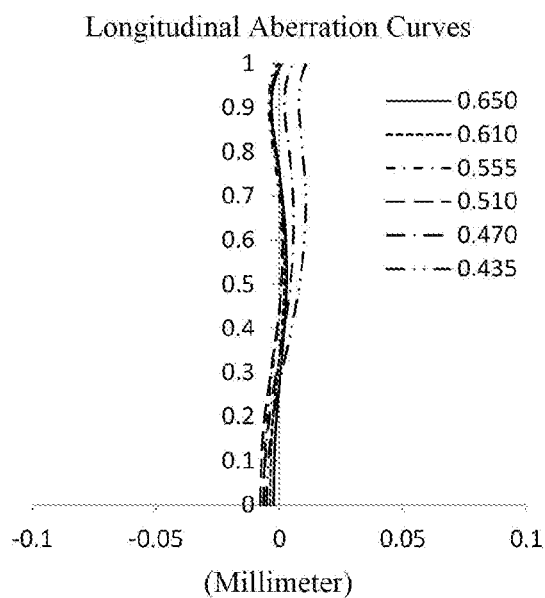
FIGS. 16A to 16D illustrate longitudinal aberration curves, astigmatic curves, a distortion curve, and a lateral color curve of the optical imaging lens assembly of the example 8, respectively.
Figure 16B:
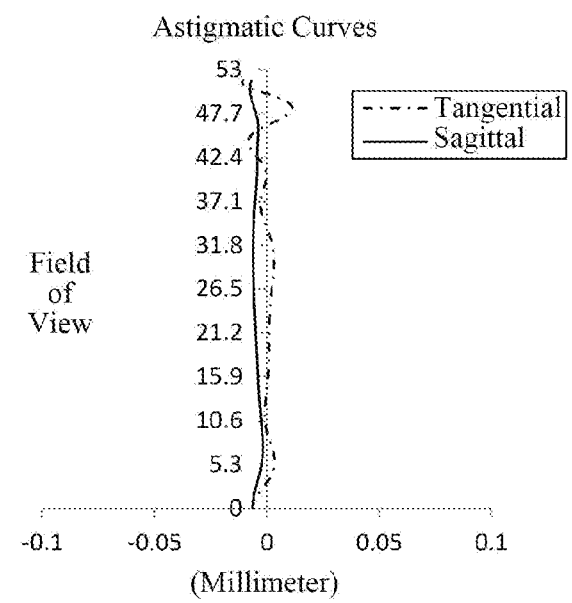
Figure 16C:
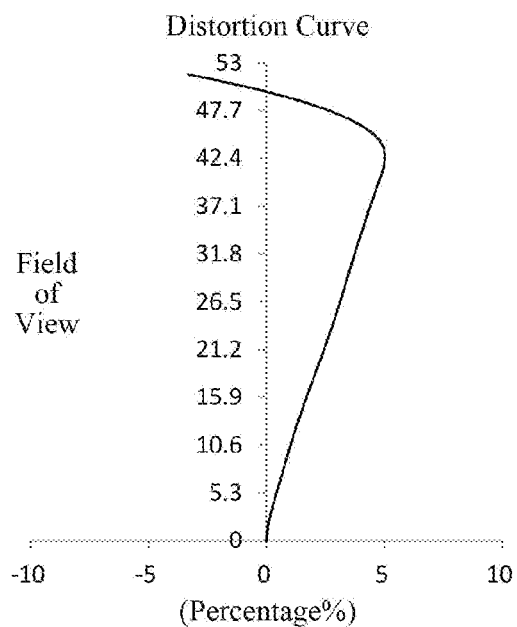
Figure 16D:
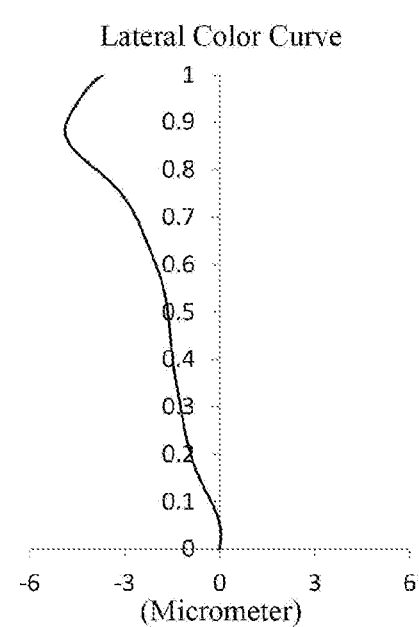

FIG. 16A illustrates longitudinal aberration curves of the optical imaging lens assembly according to example 8, representing the deviations of focal points converged by light of different wavelengths after passing through the lens assembly. FIG. 16B illustrates astigmatic curves of the optical imaging lens assembly according to example 8, representing the curvatures of a tangential plane and the curvatures of a sagittal plane. FIG. 16C illustrates a distortion curve of the optical imaging lens assembly according to example 8, representing the amounts of distortion corresponding to different field-of-views. FIG. 16D illustrates a lateral color curve of the optical imaging lens assembly according to example 8, representing the deviations of different image heights on an imaging plane after light passes through the lens assembly. It can be seen from FIG. 16A to FIG. 16D that the optical imaging lens assembly provided in example 8 may achieve good image quality.

In view of the above, examples 1 to 8 respectively satisfy the relationship shown in Table 17.

TABLE 17

| Conditional/Example | 1 | 2 | 3 | 4 | 5 | 6 | 7 | 8 |
|---|---|---|---|---|---|---|---|---|
| f1/R1 | 0.91 | 0.79 | 1.03 | 0.97 | 0.70 | 0.70 | 0.70 | 0.70 |
| ImgH/f | 1.27 | 1.28 | 1.22 | 1.22 | 1.26 | 1.23 | 1.22 | 1.24 |
| |ODT| (%) | 4.15 | 4.66 | 4.98 | 4.99 | 2.92 | 4.68 | 4.84 | 4.26 |
| FOV (°) | 107.1 | 106.4 | 104.2 | 104.0 | 104.8 | 104.3 | 104.2 | 104.5 |
| f/f2 | 0.85 | 0.84 | 0.73 | 0.78 | 0.89 | 0.65 | 0.83 | 0.60 |
| f4/f | 0.94 | 0.93 | 0.93 | 1.02 | 0.83 | 0.78 | 0.81 | 0.68 |
| f5/f1 | 0.41 | 0.39 | 0.29 | 0.34 | 0.32 | 0.15 | 0.27 | 0.15 |
| f2345/f2 | 0.76 | 0.75 | 0.67 | 0.73 | 0.78 | 0.58 | 0.72 | 0.59 |
| f/R2 | 0.28 | 0.32 | 0.21 | 0.24 | 0.38 | 0.23 | 0.39 | 0.20 |
| R8/R4 | 0.45 | 0.44 | 0.33 | 0.40 | 0.45 | 0.24 | 0.27 | 0.44 |
| R10/f5 | −0.32 | −0.32 | −0.31 | −0.28 | −0.40 | −0.51 | −0.68 | −0.27 |
| CT1/T12 | 0.48 | 0.50 | 0.35 | 0.35 | 0.42 | 0.33 | 0.21 | 0.29 |
| CT3/CT2 | 0.44 | 0.44 | 0.54 | 0.44 | 0.61 | 0.45 | 0.32 | 0.44 |
| (T23 + T34 + T45)/CT4 | 0.53 | 0.53 | 0.51 | 0.65 | 0.34 | 0.35 | 0.80 | 0.47 |
| CT5/ET5 | 0.60 | 0.61 | 0.53 | 0.48 | 0.52 | 0.51 | 0.48 | 0.33 |
| ET2/ET1 | 0.83 | 0.84 | 0.79 | 0.75 | 0.82 | 1.06 | 0.91 | 1.04 |
| SAG22/SAG42 | 0.36 | 0.36 | 0.39 | 0.43 | 0.44 | 0.38 | 0.41 | 0.32 |

The present disclosure further provides an imaging apparatus, having an electronic photosensitive element which may be a photosensitive Charge-Coupled Device (CCD) or a Complementary Metal-Oxide Semiconductor (CMOS). The imaging apparatus may be an independent imaging device such as a digital camera, or may be an imaging module integrated in a mobile electronic device such as a mobile phone. The imaging apparatus is equipped with the optical imaging lens assembly described above.

The foregoing is only a description of the preferred examples of the present disclosure and the applied technical principles. It should be appreciated by those skilled in the art that the inventive scope of the present disclosure is not limited to the technical solutions formed by the particular combinations of the above technical features. The inventive scope should also cover other technical solutions formed by any combinations of the above technical features or equivalent features thereof without departing from the concept of the present disclosure, such as, technical solutions formed by replacing the features as disclosed in the present disclosure with (but not limited to), technical features with similar functions.

What is claimed is:

1. An optical imaging lens assembly, sequentially from an object side to an image side of the optical imaging lens assembly along an optical axis, comprising:
   a first lens having refractive power, a concave object-side surface and a concave image-side surface;
   a second lens having positive refractive power;
   a third lens having refractive power and a convex object-side surface;
   a fourth lens having positive refractive power; and
   a fifth lens having negative refractive power,
   wherein $0.7 \leq f1/R1 < 1.5$, where f1 is an effective focal length of the first lens, and R1 is a radius of curvature of the object-side surface of the first lens; and
   $0.1 < CT1/T12 < 0.6$,
   where CT1 is a center thickness of the first lens along the optical axis, and T12 is an air interval between the first lens and the second lens along the optical axis.

2. The optical imaging lens assembly according to claim 1, wherein $ImgH/f < 1.4$,
   where ImgH is half of a diagonal length of an effective pixel area on an imaging plane of the optical imaging lens assembly, and f is a total effective focal length of the optical imaging lens assembly.

3. The optical imaging lens assembly according to claim 1, wherein 100°<FOV<125°,
where FOV is a maximum field-of-view of the optical imaging lens assembly.

4. The optical imaging lens assembly according to claim 1, wherein 0.5<f/f2<1,
where f is a total effective focal length of the optical imaging lens assembly, and f2 is an effective focal length of the second lens.

5. The optical imaging lens assembly according to claim 1, wherein 0.6<f4/f<1.1,
where f is a total effective focal length of the optical imaging lens assembly, and f4 is an effective focal length of the fourth lens.

6. The optical imaging lens assembly according to claim 1, wherein 0<f5/f1<0.5,
where f1 is the effective focal length of the first lens, and f5 is an effective focal length of the fifth lens.

7. The optical imaging lens assembly according to claim 1, wherein 0<f/R2<0.5,
where f is a total effective focal length of the optical imaging lens assembly, and R2 is a radius of curvature of the image-side surface of the first lens.

8. The optical imaging lens assembly according to claim 1, wherein 0<R8/R4<0.5,
where R4 is a radius of curvature of an image-side surface of the second lens, and R8 is a radius of curvature of an image-side surface of the fourth lens.

9. The optical imaging lens assembly according to claim 1, wherein −0.7<R10/f5<−0.2,
where R10 is a radius of curvature of an image-side surface of the fifth lens, and f5 is an effective focal length of the fifth lens.

10. The optical imaging lens assembly according to claim 1, wherein 0.2<CT3/CT2<0.7,
where CT2 is a center thickness of the second lens along the optical axis, and CT3 is a center thickness of the third lens along the optical axis.

11. The optical imaging lens assembly according to claim 1, wherein 0.2<CT5/ET5<0.7,
where CT5 is a center thickness of the fifth lens along the optical axis, ET5 is an edge thickness of the fifth lens, and the edge thickness of the fifth lens is thickness of the upper or lower section of the fifth lens.

12. The optical imaging lens assembly according to claim 1, wherein 0.7<ET2/ET1<1.2,
where ET1 is an edge thickness of the first lens, ET2 is an edge thickness of the second lens, the edge thickness of the first lens is thickness of the upper or lower section of the first lens, and the edge thickness of the second lens is thickness of the upper or lower section of the second lens.

13. The optical imaging lens assembly according to claim 1, wherein 0.1<SAG22/SAG42<0.6,
where SAG22 is an on-axis distance from an intersection of an image-side surface of the second lens and the optical axis to a vertex of an effective radius of the image-side surface of the second lens, and SAG42 is an on-axis distance from an intersection of an image-side surface of the fourth lens and the optical axis to a vertex of an effective radius of the image-side surface of the fourth lens.

14. The optical imaging lens assembly according to claim 1, wherein 0.5<f2345/f2<1,
where f2345 is a combined focal length of the second lens, the third lens, the fourth lens, and the fifth lens, and f2 is an effective focal length of the second lens.

15. The optical imaging lens assembly according to claim 1, wherein 0.3<(T23+T34+T45)/CT4<0.9,
where T23 is an air interval between the second lens and the third lens along the optical axis, T34 is an air interval between the third lens and the fourth lens along the optical axis, T45 is an air interval between the fourth lens and the fifth lens along the optical axis, and CT4 is a center thickness of the fourth lens along the optical axis.

* * * * *